(12) United States Patent
Liang

(10) Patent No.: US 10,116,555 B2
(45) Date of Patent: Oct. 30, 2018

(54) SWITCH MODE SWITCHING METHOD, DEVICE, AND SYSTEM

(71) Applicant: Huawei Technologies Co., Ltd., Shenzhen, Guangdong (CN)

(72) Inventor: Jianyao Liang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 16 days.

(21) Appl. No.: 15/387,200

(22) Filed: Dec. 21, 2016

(65) Prior Publication Data

US 2017/0104672 A1    Apr. 13, 2017

Related U.S. Application Data

(63) Continuation of application No. PCT/CN2014/081294, filed on Jun. 30, 2014.

(51) Int. Cl.
*H04L 12/28* (2006.01)
*H04L 12/721* (2013.01)
(Continued)

(52) U.S. Cl.
CPC .............. *H04L 45/38* (2013.01); *H04L 45/30* (2013.01); *H04L 45/52* (2013.01); *H04L 45/64* (2013.01);
(Continued)

(58) Field of Classification Search
USPC ........................................ 370/216, 389, 360
See application file for complete search history.

(56) References Cited

U.S. PATENT DOCUMENTS

| 4,996,097 A | 2/1991 | Fischer |
| 5,763,824 A | 6/1998 | King et al. |

(Continued)

FOREIGN PATENT DOCUMENTS

| CN | 1306476 A | 8/2001 |
| CN | 1774804 A | 5/2006 |

(Continued)

OTHER PUBLICATIONS

Alcatel-Lucent, "Hybrid OpenFlow Switch," Dec. 31, 2013, XP055278722, retrieved from Internet: URL: http://infodoc.alcatel-lucent.com/html/0_add-h-f/93/0073-HTML/7750_SR_OS_Router_Configuration_Guide/openflow.html#1552943, retrieved Jun. 8, 2016.

(Continued)

*Primary Examiner* — John Pezzlo

(57) ABSTRACT

Embodiments of the present invention provide a switch mode switching method, a device, and a system, so that routing and switching information in a hardware forwarding entry in the conventional switching mode is represented in a form of OpenFlow flow table. The method includes: receiving, by a switch, a mode switch request message that is sent by a controller and that is used to request the switch to switch from a conventional switching mode to an Open-Flow switching mode; freezing, by the switch, all routing and switching information tables of the switch in the conventional switching mode, and generating, according to routing and switching information in each routing and switching information table, an OpenFlow flow table corresponding to the routing and switching information table; and switching, by the switch, to the OpenFlow switching mode, and sending a mode switch response message to the controller.

19 Claims, 3 Drawing Sheets

(51) Int. Cl.
*H04L 12/725* (2013.01)
*H04L 12/741* (2013.01)
*H04L 12/935* (2013.01)
*H04L 12/781* (2013.01)
*H04L 12/715* (2013.01)
*H04J 1/16* (2006.01)
*H04L 12/46* (2006.01)

(52) U.S. Cl.
CPC ........ *H04L 45/745* (2013.01); *H04L 49/3009* (2013.01); *H04L 12/4645* (2013.01)

(56) References Cited

U.S. PATENT DOCUMENTS

| | | | |
|---|---|---|---|
| 6,051,888 A | 4/2000 | Dahl | |
| 6,097,718 A * | 8/2000 | Bion | H04L 45/02 370/351 |
| 6,518,660 B2 | 2/2003 | Kwon et al. | |
| 6,740,959 B2 | 5/2004 | Alcoe et al. | |
| 6,956,285 B2 | 10/2005 | Radu et al. | |
| 9,614,930 B2 * | 4/2017 | DeCusatis | H04L 67/34 |
| 9,986,434 B2 * | 5/2018 | Tripathi | H04W 12/06 |
| 2002/0004843 A1 * | 1/2002 | Andersson | H04L 45/00 709/238 |
| 2002/0113306 A1 | 8/2002 | Kwon et al. | |
| 2004/0170825 A1 | 9/2004 | Chung | |
| 2004/0240191 A1 | 12/2004 | Arnold et al. | |
| 2010/0096711 A1 | 4/2010 | Tian | |
| 2011/0292621 A1 | 12/2011 | Beaumier et al. | |
| 2012/0119346 A1 | 5/2012 | Yunhyeok et al. | |
| 2012/0193770 A1 | 8/2012 | Yamada et al. | |
| 2013/0315248 A1 | 11/2013 | Morimoto | |
| 2013/0318243 A1 | 11/2013 | Chinthalapati et al. | |
| 2015/0102473 A1 | 4/2015 | Yu et al. | |
| 2015/0249572 A1 * | 9/2015 | Mack-Crane | H04L 45/38 709/222 |

FOREIGN PATENT DOCUMENTS

| | | |
|---|---|---|
| CN | 102118674 A | 7/2011 |
| CN | 102573279 A | 7/2012 |
| CN | 102623438 A | 8/2012 |
| CN | 102779811 A | 11/2012 |
| CN | 103067534 A | 4/2013 |
| CN | 103152264 A | 6/2013 |
| CN | 103731370 A | 4/2014 |
| EP | 0806891 A1 | 11/1997 |

OTHER PUBLICATIONS

Kobayashi, Masayoshi, et al., "Maturing of OpenFlow and Software-defined Networking through deployments," Computer Networks, vol. 61, Nov. 18, 2013, pp. 151-175, XP028632306.

* cited by examiner

SWITCH MODE SWITCHING METHOD, DEVICE, AND SYSTEM

CROSS-REFERENCE TO RELATED APPLICATIONS

This application is a continuation of International Application No. PCT/CN2014/081294, filed on Jun. 30, 2014, the disclosure of which is hereby incorporated by reference in its entirety.

TECHNICAL FIELD

The present invention relates to the communications field, and in particular, to a switch mode switching method, a device, and a system.

BACKGROUND

OpenFlow (OpenFlow) is a core technology implementing software defined networking (SDN). In the technology, an original conventional switching mode (that is, a manner of packet forwarding completely controlled by a switch/router) is switched to an OpenFlow switching mode, and meanwhile, a conventional control plane is separated from a forwarding device, so that decision of all forwarding actions is migrated to an integrated controller. This implements separation between data forwarding and routing control. FIG. 1 is a schematic diagram of an OpenFlow network architecture in the prior art. As shown in FIG. 1, an OpenFlow network includes a controller and multiple switches. The controller controls all switches in the OpenFlow network. In the OpenFlow network, the controller first obtains related information of a data flow by means of initial-packet reporting; views, by means of the OpenFlow protocol, an OpenFlow flow table already delivered to the switches and a network status; obtains network topology info/Ration and network status information; selects an optimal path and corresponding quality of service control for the data flow according to quality of service (QoS) (for example, bandwidth, or a priority) requirements, the network topology information, and the network status information that are learned by the controller; and delivers the selected optimal path to the switches in a form of OpenFlow flow table, so that the switches perform data flow forwarding according to the OpenFlow flow table delivered by the controller. A communications network between the controller and the switches is a control plane, and a data forwarding network between switches is a data plane.

In an actual application, a hybrid (hybrid) switch is generally used in the OpenFlow network, and the hybrid switch supports two working modes: OpenFlow switching and conventional switching. When a problem occurs in a control plane network, and the switch is disconnected from the controller, the switch may enter a "fail standalone mode (fail standalone mode)" according to a preconfigured OpenFlow configuration management protocol (OF-config), that is, switch from an OpenFlow switching mode to a conventional switching mode. The switch generates a hardware forwarding table according to the conventional layer 2 forwarding technology or layer 3 routing protocol, and delivers the hardware forwarding table to a forwarding chip (ASIC) dedicated for the switch or to a network processor (NP), so that the ASIC or NP processes the data flow according to the hardware forwarding table, and directly sends a data flow matching a forwarding condition to a corresponding port.

Because in different working modes, the switch in the OpenFlow network uses different methods to obtain or calculate switching and routing information, and data structure manners for saving routing and switching information are different, the controller cannot view routing and switching information that is in the conventional mode and that is stored in the switch. When a connection between the controller and the switch resumes, and the switch switches from the conventional switching mode to the OpenFlow switching mode, generally, the switch may clear a hardware forwarding entry in the conventional switching mode. Therefore, the controller generates a new OpenFlow flow table not according to the current network topology information, and performs data forwarding. However, this may cause temporary interruption of a network service. Therefore, to ensure continuity of the network service, the controller needs to view, by means of the OpenFlow protocol, routing and switching information in the hardware forwarding entry in the current conventional switch mode, obtain current network topology information, perform global network topology control and optimization, generate a new OpenFlow flow table, and perform data forwarding. However, in the prior art, when the switch switches from the conventional switching mode to the OpenFlow switching mode, no method for representing, in a form of OpenFlow flow table, routing and switching information in a hardware forwarding entry in a conventional switching mode is provided.

SUMMARY

Embodiments of the present invention provide a switch mode switching method, a device, and a system, so that when a switch switches from a conventional switching mode to an OpenFlow switching mode, routing and switching information in a hardware forwarding entry in the conventional switching mode is represented in a form of OpenFlow flow table.

To achieve the foregoing objective, technical solutions used in the embodiments of the present invention are as follows:

According to a first aspect, an embodiment of the present invention provides a switch mode switching method, including:

receiving, by a switch, a mode switch request message sent by a controller, where the mode switch request message is used to instruct the switch to switch from a conventional switching mode to an OpenFlow switching mode;

in response to the mode switch request message, freezing, by the switch, all routing and switching information tables of the switch in the conventional switching mode, and converting, according to routing and switching information in each routing and switching information table, the routing and switching information table into an OpenFlow flow table corresponding to the routing and switching information table, where the OpenFlow flow table includes at least one OpenFlow flow entry; and switching, by the switch, to the OpenFlow switching mode, and sending a mode switch response message to the controller.

With reference to the first aspect, in a first possible implementation manner of the first aspect, the routing and switching information table is a layer 3 IP address routing table, the layer 3 IP address routing table includes at least one routing entry, and each routing entry includes a destination address, a mask, a protocol, a priority, a metrics value, a next-hop address, and an outbound port; and correspondingly, the converting, according to routing and switching information in each routing and switching information table, the routing and switching information table into an OpenFlow flow table corresponding to the routing and switching information table includes:

converting, according to the destination address, the mask, the protocol, the priority, the metrics value, the next-hop address, and the outbound port that are included in the routing entry in the layer 3 IP address routing table, each routing entry in the layer 3 IP address routing table into an OpenFlow flow entry corresponding to the routing entry, where the OpenFlow flow entry forms an OpenFlow flow table, the OpenFlow flow entry includes a match field, a match field mask, an action, and a priority, the match field in the OpenFlow flow entry includes a destination IP address, and the action in the OpenFlow flow entry includes: modify a destination MAC address and output to a specified port.

With reference to the first possible implementation manner of the first aspect, in a second possible implementation manner of the first aspect, for a first routing entry, converting the first routing entry into a first OpenFlow flow entry corresponding to the first routing entry includes:

using a destination address in the first routing entry as a destination IP address in a match field in the first OpenFlow flow entry, where the first routing entry is any routing entry in the layer 3 IP address routing table;

determining a match field mask in the first OpenFlow flow entry according to a mask in the first routing entry;

determining an action, modify destination MAC, in the first OpenFlow flow entry according to a protocol in the first routing entry or a protocol in a second routing entry, where the second routing entry is in the layer 3 IP address routing table, and a result obtained after an AND operation is performed on a destination address in the second routing entry and a mask in the second routing entry is equal to a result obtained after an AND operation is performed on a next-hop address in the first routing entry and the mask in the second routing entry;

using an outbound port in the first routing entry as a specified port for an action, output to a specified port, in the first OpenFlow flow entry; and determining a priority in the first OpenFlow flow entry according to a priority in the first routing entry, a metrics value in the first routing entry, and a number of the first routing entry, where the number of the first routing entry is a number obtained after the first routing entry and all matched entries of the first routing entry are sequenced in ascending order of lengths of masks, and a matched entry of the first routing entry is a routing entry that is in the layer 3 IP address routing table and in which a result obtained after a bitwise AND operation is performed on a destination address in the routing entry and a mask in the routing entry is equal to a result obtained after an AND operation is performed on the destination address in the first routing entry and the mask in the routing entry.

With reference to the second possible implementation manner of the first aspect, in a third possible implementation manner of the first aspect, the determining an action, modify destination MAC, in the first OpenFlow flow entry according to a protocol in the first routing entry or a protocol in a second routing entry includes:

determining whether the protocol in the first routing entry is of a direct connection type;

if the protocol in the first routing entry is of a direct connection type, using the next-hop address in the first routing entry as a destination MAC address for the action, modify destination MAC, in the first OpenFlow flow entry; or if the protocol in the first routing entry is not of a direct connection type, obtaining the second routing entry from the layer 3 IP address routing table, and determining whether the protocol in the second routing entry is of a direct connection type; and if the protocol in the second routing entry is of a direct connection type, using a next-hop address in the second routing entry as a destination MAC address for the action, modify destination MAC, in the first OpenFlow flow entry.

With reference to the second possible implementation manner of the first aspect, in a fourth possible implementation manner of the first aspect, the determining a priority in the first OpenFlow flow entry according to a priority in the first routing entry, a metrics value in the first routing entry, and a number of the first routing entry includes:

obtaining, according to a preset correspondence between a priority in a routing entry and an OpenFlow mapping value, an OpenFlow mapping value corresponding to the priority in the first routing entry, and obtaining, according to a preset correspondence between a metrics value in a routing entry and an OpenFlow mapping value, an OpenFlow mapping value corresponding to the metrics value in the first routing entry;

performing weighting on the number of the first routing entry according to a first preset weighting value, performing, according to a second preset weighting value, weighting on the OpenFlow mapping value corresponding to the priority in the first routing entry, and performing, according to a third preset weighting value, weighting on the OpenFlow mapping value corresponding to the metrics values in the first routing entry;

adding a weighting result of the number of the first routing entry, a weighting result of the OpenFlow mapping value corresponding to the priority in the first routing entry, and a weighting result of the OpenFlow mapping value corresponding to the metrics value in the first routing entry; and using an added result as the priority in the first OpenFlow flow entry.

With reference to the first aspect, in a fifth possible implementation manner of the first aspect, the routing and switching information table is a layer 2 MAC address forwarding table, the layer 2 MAC address forwarding table includes at least one forwarding entry, and the forwarding entry includes a MAC address, a virtual network identifier VLAN ID, and an outbound port; and correspondingly, the converting, according to routing and switching information in each routing and switching information table, the routing and switching information table into an OpenFlow flow table corresponding to the routing and switching information table includes:

converting, according to the MAC address, the virtual network identifier VLAN ID, and the outbound port that are included in the forwarding entry in the layer 2 MAC address forwarding table, each forwarding entry into a second OpenFlow flow entry that corresponds to the forwarding entry and that includes a match field and an action, where the OpenFlow flow entry forms a flow table, the OpenFlow flow entry includes the match field and the action, the match field in the OpenFlow flow entry includes a MAC address and a VLAN ID, and the action in the OpenFlow flow entry includes output to a specified port.

With reference to the fifth possible implementation manner of the first aspect, in a sixth possible implementation manner of the first aspect, for a first forwarding entry, converting the first forwarding entry into a second OpenFlow flow entry corresponding to the first forwarding entry includes:

using a MAC address in the first forwarding entry as a MAC address in a match field in the second OpenFlow flow entry, where the first forwarding entry is any forwarding entry in the layer 2 MAC address forwarding table;

using a VLAN ID in the first forwarding entry as a VLAN ID in the match field in the second OpenFlow flow entry; and using an outbound port in the first forwarding entry as a specified port for an action, output to a specified port, in the second OpenFlow flow entry.

With reference to any one of the first aspect, or the first to the sixth possible implementation manners of the first aspect, in a seventh possible implementation manner of the first aspect, before the receiving, by a switch, a mode switch request message sent by a controller, the method further includes:

receiving, by the switch, a mode query instruction sent by the controller, where the mode query instruction is used to query a current mode of the switch; and sending, by the switch, a mode response message including the current mode to the controller, so that when the controller detects that a current network quality parameter is within a preset threshold and the current mode is the conventional switching mode, the controller sends the mode switch request message to the switch.

With reference to the seventh possible implementation manner of the first aspect, in an eighth possible implementation manner of the first aspect, the mode switch response message is used to notify the controller that the switch successfully switches from the conventional switching mode to the OpenFlow switching mode, so that the controller reads the OpenFlow flow table and performs global network topology control and optimization.

According to a second aspect, an embodiment of the present invention provides a switch, including:

a first receiving module, configured to receive a mode switch request message sent by a controller, where the mode switch request message is used to instruct the switch to switch from a conventional switching mode to an OpenFlow switching mode;

a flow table conversion module, configured to: when the first receiving module receives the mode switch request message, freeze all routing and switching information tables of the switch in the conventional switching mode, and convert, according to routing and switching information in each routing and switching information table, the routing and switching information table into an OpenFlow flow table corresponding to the routing and switching information table, where the OpenFlow flow table includes at least one OpenFlow flow entry;

a switching module, configured to switch the switch to the OpenFlow switching mode; and a first sending module, configured to send a mode switch response message to the controller.

With reference to the second aspect, in a first possible implementation manner of the second aspect, the routing and switching information table is a layer 3 IP address routing table, the layer 3 IP address routing table includes at least one routing entry, and each routing entry includes a destination address, a mask, a protocol, a priority, a metrics value, a next-hop address, and an outbound port; and correspondingly, the flow table conversion module is specifically configured to:

convert, according to the destination address, the mask, the protocol, the priority, the metrics value, the next-hop address, and the outbound port that are included in the routing entry in the layer 3 IP address routing table, each routing entry in the layer 3 IP address routing table into an OpenFlow flow entry corresponding to the routing entry, where the OpenFlow flow entry forms an OpenFlow flow table, the OpenFlow flow entry includes a match field, a match field mask, an action, and a priority, the match field in the OpenFlow flow entry includes a destination IP address, and the action in the OpenFlow flow entry includes: modify a destination MAC address and output to a specified port.

With reference to the first possible implementation manner of the second aspect, in a second possible implementation manner of the second aspect, for a first routing entry, the flow table conversion module is specifically configured to:

use a destination address in the first routing entry as a destination IP address in a match field in a first OpenFlow flow entry, where the first routing entry is any routing entry in the layer 3 IP address routing table;

determine a match field mask in the first OpenFlow flow entry according to a mask in the first routing entry;

determine an action, modify destination MAC, in the first OpenFlow flow entry according to a protocol in the first routing entry or a protocol in a second routing entry, where the second routing entry is in the layer 3 IP address routing table, and a result obtained after an AND operation is performed on a destination address in the second routing entry and a mask in the second routing entry is equal to a result obtained after an AND operation is performed on a next-hop address in the first routing entry and the mask in the second routing entry;

use an outbound port in the first routing entry as a specified port for an action, output to a specified port, in the first OpenFlow flow entry; and determine a priority in the first OpenFlow flow entry according to a priority in the first routing entry, a metrics value in the first routing entry, and a number of the first routing entry, where the number of the first routing entry is a number obtained after the first routing entry and all matched entries of the first routing entry are sequenced in ascending order of lengths of masks, and a matched entry of the first routing entry is a routing entry that is in the layer 3 IP address routing table and in which a result obtained after a bitwise AND operation is performed on a destination address in the routing entry and a mask in the routing entry is equal to a result obtained after an AND operation is performed on the destination address in the first routing entry and the mask in the routing entry.

With reference to the second possible implementation manner of the second aspect, in a third possible implementation manner of the second aspect, the flow table conversion module is specifically configured to:

determine whether the protocol in the first routing entry is of a direct connection type;

if the protocol in the first routing entry is of a direct connection type, use the next-hop address in the first routing entry as a destination MAC address for the action, modify destination MAC, in the first OpenFlow flow entry; or if the protocol in the first routing entry is not of a direct connection type, obtain the second routing entry from the layer 3 IP address routing table, and determine whether the protocol in the second routing entry is of a direct connection type; and if the protocol in the second routing entry is of a direct connection type, use a next-hop address in the second routing entry as a destination MAC address for the action, modify destination MAC, in the first OpenFlow flow entry.

With reference to the second possible implementation manner of the second aspect, in a fourth possible implementation manner of the second aspect, the flow table conversion module is specifically configured to:

obtain, according to a preset correspondence between a priority in a routing entry and an OpenFlow mapping value, an OpenFlow mapping value corresponding to the priority in the first routing entry, and obtain, according to a preset correspondence between a metrics value in a routing entry and an OpenFlow mapping value, an OpenFlow mapping value corresponding to the metrics value in the first routing entry;

perform weighting on the number of the first routing entry according to a first preset weighting value, perform, according to a second preset weighting value, weighting on the OpenFlow mapping value corresponding to the priority in the first routing entry, and perform, according to a third preset weighting value, weighting on the OpenFlow mapping value corresponding to the metrics values in the first routing entry;

add a weighting result of the number of the first routing entry, a weighting result of the OpenFlow mapping value corresponding to the priority in the first routing entry, and a weighting result of the OpenFlow mapping value corresponding to the metrics value in the first routing entry; and use an added result as the priority in the first OpenFlow flow entry.

With reference to the second aspect, in a fifth possible implementation manner of the second aspect, the routing and switching information table is a layer 2 MAC address forwarding table, the layer 2 MAC address forwarding table includes at least one forwarding entry, and the forwarding entry includes a MAC address, a virtual network identifier VLAN ID, and an outbound port; and correspondingly, the flow table conversion module is specifically configured to:

convert, according to the MAC address, the virtual network identifier VLAN ID, and the outbound port that are included in the forwarding entry in the layer 2 MAC address forwarding table, each forwarding entry into a second OpenFlow flow entry that corresponds to the forwarding entry and that includes a match field and an action, where the OpenFlow flow entry forms a flow table, the OpenFlow flow entry includes the match field and the action, the match field in the OpenFlow flow entry includes a MAC address and a VLAN ID, and the action in the OpenFlow flow entry includes output to a specified port.

With reference to the fifth possible implementation manner of the second aspect, in a sixth possible implementation manner of the second aspect, the flow table conversion module is specifically configured to:

use a MAC address in the first forwarding entry as a MAC address in a match field in a second OpenFlow flow entry, where the first forwarding entry is any forwarding entry in the layer 2 MAC address forwarding table;

use a VLAN ID in the first forwarding entry as a VLAN ID in the match field in the second OpenFlow flow entry; and use an outbound port in the first forwarding entry as a specified port for an action, output to a specified port, in the second OpenFlow flow entry.

With reference to any one of the second aspect, or the first to the sixth possible implementation manners of the second aspect, in a seventh possible implementation manner of the second aspect, the switch further includes:

a second receiving module, configured to: before the first receiving module receives the mode switch request message sent by the controller, receive a mode query instruction sent by the controller, where the mode query instruction is used to query a current mode of the switch; and a second sending module, configured to send a mode response message including the current mode to the controller, so that when the controller detects that a current network quality parameter is within a preset threshold and the current mode is the conventional switching mode, the controller sends the mode switch request message to the switch.

With reference to the seventh possible implementation manner of the second aspect, in an eighth possible implementation manner of the second aspect, the mode switch response message is used to notify the controller that the switch successfully switches from the conventional switching mode to the OpenFlow switching mode, so that the controller reads the OpenFlow flow table and performs global network topology control and optimization.

According to a third aspect, an embodiment of the present invention provides a switch mode switching system, including the switch according to any one of the second aspect, or the first to the eighth possible implementation manners of the second aspect, and a controller, where the controller is configured to control the switch in a centralized manner.

According to a fourth aspect, an embodiment of the present invention provides a switch, including:

a communications unit, configured to receive a mode switch request message sent by a controller, where the mode switch request message is used to instruct the switch to switch from a conventional switching mode to an OpenFlow switching mode; and a processor, configured to: when the communications unit receives the mode switch request message, freeze all routing and switching information tables of the switch in the conventional switching mode, and convert, according to routing and switching information in each routing and switching information table, the routing and switching information table into an OpenFlow flow table corresponding to the routing and switching information table, where the OpenFlow flow table includes at least one OpenFlow flow entry, where the processor is further configured to switch the switch to the OpenFlow switching mode; and the communications unit is further configured to send a mode switch response message to the controller.

With reference to the fourth aspect, in a first possible implementation manner of the fourth aspect, the routing and switching information table is a layer 3 IP address routing table, the layer 3 IP address routing table includes at least one routing entry, and each routing entry includes a destination address, a mask, a protocol, a priority, a metrics value, a next-hop address, and an outbound port; and correspondingly, the processor is specifically configured to:

convert, according to the destination address, the mask, the protocol, the priority, the metrics value, the next-hop address, and the outbound port that are included in the routing entry in the layer 3 IP address routing table, each routing entry in the layer 3 IP address routing table into an OpenFlow flow entry corresponding to the routing entry, where the OpenFlow flow entry forms an OpenFlow flow table, the OpenFlow flow entry includes a match field, a match field mask, an action, and a priority, the match field in the OpenFlow flow entry includes a destination IP address, and the action in the OpenFlow flow entry includes: modify a destination MAC address and output to a specified port.

With reference to the first possible implementation manner of the fourth aspect, in a second possible implementation manner of the fourth aspect, for a first routing entry, the processor is specifically configured to:

use a destination address in the first routing entry as a destination IP address in a match field in a first OpenFlow flow entry, where the first routing entry is any routing entry in the layer 3 IP address routing table;

determine a match field mask in the first OpenFlow flow entry according to a mask in the first routing entry;

determine an action, modify destination MAC, in the first OpenFlow flow entry according to a protocol in the first routing entry or a protocol in a second routing entry, where the second routing entry is in the layer 3 IP address routing table, and a result obtained after an AND operation is performed on a destination address in the second routing entry and a mask in the second routing entry is equal to a result obtained after an AND operation is performed on a next-hop address in the first routing entry and the mask in the second routing entry;

use an outbound port in the first routing entry as a specified port for an action, output to a specified port, in the first OpenFlow flow entry; and determine a priority in the first OpenFlow flow entry according to a priority in the first routing entry, a metrics value in the first routing entry, and a number of the first routing entry, where the number of the first routing entry is a number obtained after the first routing entry and all matched entries of the first routing entry are sequenced in ascending order of lengths of masks, and a matched entry of the first routing entry is a routing entry that is in the layer 3 IP address routing table and in which a result obtained after a bitwise AND operation is performed on a destination address in the routing entry and a mask in the routing entry is equal to a result obtained after an AND operation is performed on the destination address in the first routing entry and the mask in the routing entry.

With reference to the second possible implementation manner of the fourth aspect, in a third possible implementation manner of the fourth aspect, the processor is specifically configured to:

determine whether the protocol in the first routing entry is of a direct connection type;

if the protocol in the first routing entry is of a direct connection type, use the next-hop address in the first routing entry as a destination MAC address for the action, modify destination MAC, in the first OpenFlow flow entry; or if the protocol in the first routing entry is not of a direct connection type, obtain the second routing entry from the layer 3 IP address routing table, and determine whether the protocol in the second routing entry is of a direct connection type; and if the protocol in the second routing entry is of a direct connection type, use a next-hop address in the second routing entry as a destination MAC address for the action, modify destination MAC, in the first OpenFlow flow entry.

With reference to the second possible implementation manner of the fourth aspect, in a fourth possible implementation manner of the fourth aspect, the processor is specifically configured to:

obtain, according to a preset correspondence between a priority in a routing entry and an OpenFlow mapping value, an OpenFlow mapping value corresponding to the priority in the first routing entry, and obtain, according to a preset correspondence between a metrics value in a routing entry and an OpenFlow mapping value, an OpenFlow mapping value corresponding to the metrics value in the first routing entry;

perform weighting on the number of the first routing entry according to a first preset weighting value, perform, according to a second preset weighting value, weighting on the OpenFlow mapping value corresponding to the priority in the first routing entry, and perform, according to a third preset weighting value, weighting on the OpenFlow mapping value corresponding to the metrics values in the first routing entry;

add a weighting result of the number of the first routing entry, a weighting result of the OpenFlow mapping value corresponding to the priority in the first routing entry, and a weighting result of the OpenFlow mapping value corresponding to the metrics value in the first routing entry; and use an added result as the priority in the first OpenFlow flow entry.

With reference to the fourth aspect, in a fifth possible implementation manner of the fourth aspect, the routing and switching information table is a layer 2 MAC address forwarding table, the layer 2 MAC address forwarding table includes at least one forwarding entry, and the forwarding entry includes a MAC address, a virtual network identifier VLAN ID, and an outbound port; and correspondingly, the processor is specifically configured to:

convert, according to the MAC address, the virtual network identifier VLAN ID, and the outbound port that are included in the forwarding entry in the layer 2 MAC address forwarding table, each forwarding entry into a second OpenFlow flow entry that corresponds to the forwarding entry and that includes a match field and an action, where the OpenFlow flow entry forms a flow table, the OpenFlow flow entry includes the match field and the action, the match field in the OpenFlow flow entry includes a MAC address and a VLAN ID, and the action in the OpenFlow flow entry includes output to a specified port.

With reference to the fifth possible implementation manner of the fourth aspect, in a sixth possible implementation manner of the fourth aspect, the processor is specifically configured to:

use a MAC address in a first forwarding entry as a MAC address in a match field in a second OpenFlow flow entry, where the first forwarding entry is any forwarding entry in the layer 2 MAC address forwarding table;

use a VLAN ID in the first forwarding entry as a VLAN ID in the match field in the second OpenFlow flow entry; and use an outbound port in the first forwarding entry as a specified port for an action, output to a specified port, in the second OpenFlow flow entry.

With reference to any one of the fourth aspect, or the first to the sixth possible implementation manners of the fourth aspect, in a seventh possible implementation manner of the fourth aspect, the communications unit is further configured to: before the communications unit receives the mode switch request message sent by the controller, receive a mode query instruction sent by the controller, where the mode query instruction is used to query a current mode of the switch; and send a mode response message including the current mode to the controller, so that when the controller detects that a current network quality parameter is within a preset threshold and the current mode is the conventional switching mode, the controller sends the mode switch request message to the switch.

With reference to the seventh possible implementation manner of the fourth aspect, in an eighth possible implementation manner of the fourth aspect, the mode switch response message is used to notify the controller that the switch successfully switches from the conventional switching mode to the OpenFlow switching mode, so that the controller reads the OpenFlow flow table and performs global network topology control and optimization.

According to a fifth aspect, an embodiment of the present invention provides a switch mode switching system, including the switch according to any one of the fourth aspect, or the first to the eighth possible implementation manners of the fourth aspect, and a controller, where the controller is configured to control the switch in a centralized manner.

In the switch mode switching method, the device, and the system that are provided in the embodiments of the present invention, after a connection between a switch and a controller resumes, the switch receives a mode switch request message that is sent by the controller and that is used to request the switch to switch from a conventional switching mode to an OpenFlow switching mode; the switch starts to freeze all routing and switching information tables of the switch in the conventional switching mode, and converts, according to routing and switching information in each routing and switching information table, the routing and switching information table into an OpenFlow flow table corresponding to the routing and switching information table; and the switch switches to the OpenFlow switching mode, and sends a mode switch response message to the controller. In this way, when the switch switches from the conventional switching mode to the OpenFlow switching mode, a routing and switching information table in the conventional switching mode is converted into an OpenFlow flow table corresponding to the routing and switching information table, so that routing and switching information in the conventional switching mode is represented in a form of OpenFlow flow table.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Embodiment 1

Figure 1:
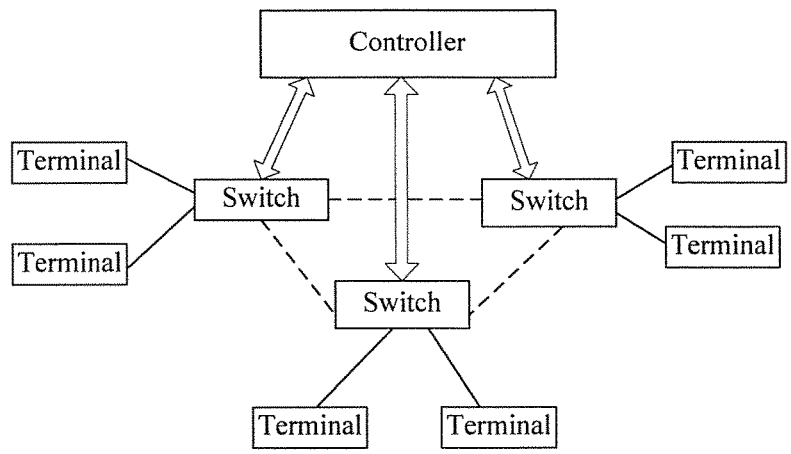
FIG. 1 is a schematic diagram of an OpenFlow network architecture in the prior art.
Figure 2:
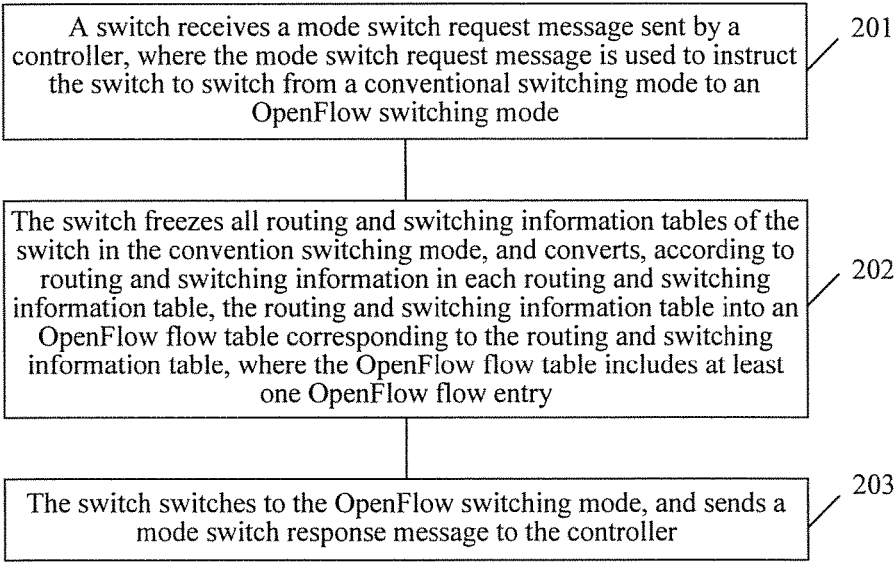
FIG. 2 is a flowchart of a switch mode switching method according to an embodiment of the present invention.

FIG. 2 is a flowchart of a switch mode switching method according to this embodiment of the present invention. As shown in FIG. 2, the method may include the following steps:

201: A switch receives a mode switch request message sent by a controller, where the mode switch request message is used to instruct the switch to switch from a conventional switching mode to an OpenFlow switching mode.

It should be noted that, the switch supports two working modes: conventional switching and OpenFlow (OpenFlow) switching. A current working mode of the switch is the conventional switching mode, that is, the switch creates a network topology by means of the conventional layer 2 forwarding technology or layer 3 routing protocol, and sends a data packet to a corresponding port according to the network topology.

202: The switch freezes all routing and switching information tables of the switch in the conventional switching mode, and converts, according to routing and switching information in each routing and switching information table, the routing and switching information table into an OpenFlow flow table corresponding to the routing and switching information table, where the OpenFlow flow table includes at least one OpenFlow flow entry.

Preferably, the freezing all routing and switching information tables of the switch in the conventional switching mode may be: stopping modifying or deleting all routing and switching information tables in the conventional switching mode.

When the switch is in the conventional switching mode, data forwarding between switches needs to be implemented by means of a layer 3 IP address routing table created by means of the routing protocol such as the Open Shortest Path First (OSPF), or by means of routing and switching information in a layer 2 MAC address forwarding table created by means of MAC address learning. Therefore, the routing and switching information table generated in the conventional switching mode may be the layer 3 IP address routing table and/or layer 2 MAC address forwarding table. Correspondingly, the generating, according to routing and switching information in each routing and switching information table, an OpenFlow flow table corresponding to the routing and switching information table may be classified into the following two cases: (1) and (2).

(1): The routing and switching information table is the layer 3 IP address routing table.

The layer 3 IP address routing table may include at least one routing entry, and each routing entry includes a destination address, a mask, a protocol, a priority, a metrics value, a next-hop address, and an outbound port, and correspondingly, the OpenFlow flow entry further includes a match field mask and a priority, and the converting, according to routing and switching information in each routing and switching information table, the routing and switching information table into an OpenFlow flow table corresponding to the routing and switching information table may include:

converting, according to the destination address, the mask, the protocol, the priority, the metrics value, the next-hop address, and the outbound port that are included in the routing entry in the layer 3 IP address routing table, each routing entry in the layer 3 IP address routing table into an OpenFlow flow entry corresponding to the routing entry, where the OpenFlow flow entry forms an OpenFlow flow table, the OpenFlow flow entry includes a match field, a match field mask, an action, and a priority, the match field in the OpenFlow flow entry includes a destination IP address, and the action in the OpenFlow flow entry includes: modify a destination MAC address and output to a specified port.

The match field in the OpenFlow flow entry is used to perform matching on content of a packet header in a data packet received by the switch, is defined by the OpenFlow protocol, supports abundant packet match fields, and supports an Internet Protocol (IP) address mask, including a subnet mask or any mask. Each match field has a priority, and packet matching needs to be performed according to a sequence of priorities of match fields. The match field may include one or more of a switch port (switch port), a virtual network identifier (VLAN ID), a source MAC address, a destination MAC address, an Ethernet type, a source IP address, a destination IP address, an IP protocol, a Transmission Control Protocol (TCP) source port, or a TCP target port.

The action in the OpenFlow flow entry is used to indicate, to the switch, how to process, after a matched data packet is received, the data packet, including modifying a destination MAC address of the data packet, and/or outputting the data packet to a specified port.

The data packet is a data unit of TCP/IP protocol communication data transmission and includes a packet header and a packet body. The packet header includes a destination IP address, a source IP address, a destination MAC address, and a source MAC address.

Preferably, for a first routing entry (the first routing entry is any routing entry in the layer 3 IP address routing table), the first routing entry may be converted, by using the following steps (a) to (e), into a first OpenFlow flow entry corresponding to the first routing entry.

(a): Use a destination address in the first routing entry as a destination IP address in a match field in the first OpenFlow flow entry.

For example, if the destination address in the first routing entry is 50.8.0.0, the destination IP address in the match field in the first OpenFlow flow entry corresponding to the routing entry is 50.8.0.0.

(b): Determine a match field mask in the first OpenFlow flow entry according to a mask in the first routing entry.

For example, if the mask in the first routing entry is 8, it represents high eight bits of a matched destination address, and correspondingly, 0xFF000000 is used as the match field mask in the first OpenFlow flow entry.

(c): Determine an action, modify destination MAC, in the first OpenFlow flow entry according to a protocol in the first routing entry or a protocol in a second routing entry, where the second routing entry is in the layer 3 IP address routing table, and a result obtained after an AND operation is performed on a destination address in the second routing entry and a mask in the second routing entry is equal to a result obtained after an AND operation is performed on a next-hop address in the first routing entry and the mask in the second routing entry.

(d): Use an outbound port in the first routing entry as a specified port for an action, output to a specified port, in the first OpenFlow flow entry.

For example, if the outbound port in the first routing entry is E0/2, the specified port for the action, output to a specified port, in the first OpenFlow flow entry corresponding to the first routing entry is E0/2.

(e): Determine a priority in the first OpenFlow flow entry according to a priority in the first routing entry, a metrics value in the first routing entry, and a number of the first routing entry.

The number of the first routing entry is a number obtained after the first routing entry and all matched entries of the first routing entry are sequenced in ascending order of lengths of masks. The matched entry of the first routing entry is a routing entry that is in the layer 3 IP address routing table and in which a result obtained after a bitwise AND operation is performed on a destination address in the routing entry and a mask in the routing entry is the same as a result obtained after an AND operation is performed on the destination address in the first routing entry and the mask in the routing entry.

For example, if the destination address/the mask in the first routing entry is 50.8.3.0/24 and the mask is 24, in the layer 3 IP address routing table, a matched entry of the first routing entry is a routing entry in which a destination address/a mask is 50.8.0.0/16, and routing entries of 50.8.3.0/24 and 50.8.0.0/16 are sequenced in ascending order of lengths of masks. Because the mask 24 is greater than the mask 16, a result obtained after sequencing is: a number of the routing entry corresponding to 50.8.3.0/24 is 1, and a number of the routing entry corresponding to 50.8.0.0/16 is 0.

If in the layer 3 IP address routing table, the matched entries of the first routing entry are a routing entry in which a destination address/a mask is 50.8.0.0/16 and a routing entry in which a destination address/a mask is 50.0.0.0/8, and a result obtained after 50.8.3.0/24, 50.8.0.0/16, 50.0.0.0/8 are sequenced is 2, 1, 0, it is determined that the number of the first routing entry of 50.8.3.0/24 is 2.

Preferably, in step (c), the determining an action, modify destination MAC, in the first OpenFlow flow entry according to a protocol in the first routing entry or a protocol in a second routing entry may include:

checking the protocol in the first routing entry, to determine whether the protocol in the first routing entry is of a direct connection type; and if yes, using a MAC address corresponding to the next-hop address in the first routing entry as a destination MAC address for the action, modify destination MAC, in the OpenFlow flow entry; or if not, checking whether there is the second routing entry in the layer 3 IP address routing table; if there is the second routing entry, determining whether the protocol in the second routing entry is of a direct connection type; and if the protocol in the second routing entry is of a direct connection type, using a MAC address corresponding to the next-hop address in the first routing entry as a destination MAC address for the action, modify destination MAC, in the OpenFlow flow entry; or if the protocol in the second routing entry is not of a direct connection type, checking whether there is a third routing entry in the layer 3 IP address routing table, and if there is the third routing entry, determining whether a protocol in the third routing entry is of a direct connection type; and if the protocol in the third routing entry is of a direct connection type, using a MAC address corresponding to a next-hop address in the third routing entry as a destination MAC address for the action, modify destination MAC, in the OpenFlow flow entry, where a result obtained after an AND operation is performed on a destination address in the third routing entry and a mask in the third routing entry is equal to a result obtained after an AND operation is performed on a next-hop address in the second routing entry and the mask in the third routing entry.

The MAC address corresponding to the next-hop address needs to be obtained by searching an address resolution protocol (ARP) table prestored in the switch, and the ARP table is used to describe a correspondence among an IP address, a MAC address, and an outbound port.

For example, Table 1 is an ARP table. If a next-hop address in a routing entry is 40.0.0.2, it can be known from Table 1 that a MAC address corresponding to 40.0.0.2 is 28-6e-d4-88-d1-ae; therefore, 28-6e-d4-88-d1-ae is used as a destination MAC address for an action, modify destination MAC, in an OpenFlow flow entry.

TABLE 1

| IP address | MAC address | Outbound port |
|---|---|---|
| 20.0.0.1 | 28-6e-d4-88-d3-e1 | E0/2 |
| 30.0.0.2 | 28-6e-d4-88-d9-54 | E0/2 |
| 40.0.0.2 | 28-6e-d4-88-d1-ae | E0/2 |

It should be noted that, in step (c), if there is no second routing entry, the first routing entry is not converted into the first OpenFlow flow entry; or if there is no third routing entry, the first routing entry is not converted into the first OpenFlow flow entry; or if the protocol in the third routing entry is not of a direct connection type, the foregoing process is repeated.

Preferably, in step (e), the determining a priority in the first OpenFlow flow entry according to a priority in the first routing entry, a metrics value in the first routing entry, and a number of the first routing entry may include:

obtaining, according to a preset correspondence between a priority in a routing entry and an OpenFlow mapping value, an OpenFlow mapping value corresponding to the priority in the first routing entry, and obtaining, according to a preset correspondence between a metrics value in a routing entry and an OpenFlow mapping value, an OpenFlow mapping value corresponding to the metrics value in the first routing entry;

performing weighting on the number of the first routing entry according to a first preset weighting value, performing, according to a second preset weighting value, weighting on the OpenFlow mapping value corresponding to the priority in the first routing entry, and performing, according to a third preset weighting value, weighting on the OpenFlow mapping value corresponding to the metrics values in the first routing entry;

adding a weighting result of the number of the first routing entry, a weighting result of the OpenFlow mapping value corresponding to the priority in the first routing entry, and a weighting result of the OpenFlow mapping value corresponding to the metrics value in the first routing entry; and using an added result as the priority in the first OpenFlow flow entry.

The correspondence between a priority in a routing entry and an OpenFlow mapping value may be preset according to a rule that a larger value of a priority in a routing entry indicates a smaller corresponding OpenFlow mapping value.

For example, Table 2 is a table of the correspondence between a priority in a routing entry and an OpenFlow mapping value. As shown in Table 2, when a priority is 0, a corresponding OpenFlow mapping value is 63; and when a priority is 256, a corresponding OpenFlow mapping value is 1.

It should be noted that the correspondence between a priority in a routing entry and an OpenFlow mapping value needs to be set according to only a rule that a larger value of a priority in a routing entry indicates a smaller corresponding OpenFlow mapping value, an OpenFlow mapping value corresponding to a priority is variable, and a specific value may be set according to requirements, which is not limited in this embodiment of the present invention.

TABLE 2

| Priority | OpenFlow mapping value |
|---|---|
| 0 | 63 |
| 10 | 40 |
| 60 | 30 |
| 100 | 20 |
| 150 | 10 |
| 256 | 1 |

The correspondence between a metrics value in a routing entry and an OpenFlow mapping value may be set to: 127−metrics value. For example, if a metrics value in a routing entry is 50, an OpenFlow mapping value corresponding to the metrics value is 127−50=77.

It should be noted that the first preset weighting value is greater than the second preset weighting value and the second weighting value is greater than the third preset weighting value. That is, when the priority in the first OpenFlow flow entry is determined, a proportion of the number of the first routing entry is the largest, a proportion of the priority in the first routing entry is the second largest, and a proportion of the metrics value in the first routing entry is the smallest, where specific values of the first preset weighting value, the second weighting value, and the third preset weighting value are preset according to requirements, which is not limited in this embodiment of the present invention.

For example, if the number of the first routing entry is 2, the OpenFlow mapping value corresponding to the priority in the first routing entry is 10, the OpenFlow mapping value corresponding to the metrics value in the first routing entry is 55, the first weighting value is 512, the second preset weighting value is 8, and the third preset weighting value is 1, the priority in the first OpenFlow flow entry is: 2×512+ 10×8+55×1=1159.

Preferably, the priority in the first OpenFlow flow entry may be determined by using the following steps (I) to (III) according to the priority in the first routing entry, the metrics value in the first routing entry, and the number of the first routing entry.

(I): Perform Y-bit binary conversion on the OpenFlow mapping value corresponding to the priority in the first routing entry, perform Z-bit binary conversion on the OpenFlow mapping value corresponding to the metrics values in the first routing entry, and perform X-bit binary conversion on the number of the first routing entry, where X+Y+Z=16.

It should be noted that, X is greater than or equal to 3, $2^Y$ is greater than or equal to an OpenFlow mapping value corresponding to the smallest priority in the routing entry in the preset correspondence between a priority in a routing entry and an OpenFlow mapping value, and $2^Z$ is greater than or equal to 127. X=3, Y=6, and Z=7 by default.

(II): Sequence an X-bit binary number, a Y-bit binary number, and a Z-bit binary number in descending order to form a 16-bit binary number. For example, a number of a routing entry is 0 and is converted into an X-bit binary number 000; an OpenFlow mapping value corresponding to a priority 100 in the routing entry is 20 and is converted into a Y-bit binary number 010100; a metrics value in the routing entry is 10, and a corresponding OpenFlow value is 127−10=117 and is converted into a Z-bit binary number 1110101. The X-bit binary number, the Y-bit binary number, and the Z-bit binary number are sequenced in descending order to obtain: 0000101001110101.

(III): Perform binary to decimal conversion on the 16-bit binary number, and use a value obtained after the conversion as the priority in the first OpenFlow flow entry.

For example, if the 16-bit binary number is 0000101001110101, and a decimal number obtained after the conversion is $2^0+2^2+2^4+2^5+2^6+2^9+2^{11}=2677$, the priority in the first OpenFlow flow entry is 2677.

Table 3 is a layer 3 IP address routing table. The following specifically describes the foregoing method by using an example in which a routing entry in which a destination address is 50.8.3.0 is converted into an OpenFlow flow entry (as shown in Table 4) corresponding to the routing entry.

TABLE 3

| Destination address | Mask | Protocol | Priority | Metrics value | Next-hop address | Outbound port |
|---|---|---|---|---|---|---|
| 40.0.0.0 | 24 | OSPF | 0 | 5 | 20.0.0.2 | E0/2 |
| 20.0.0.0 | 24 | Direct | 0 | 0 | 20.0.0.1 | E0/2 |
| 50.8.3.0 | 24 | OSPF | 10 | 50 | 40.0.0.2 | E0/2 |

TABLE 4

| Match field | Match field mask | Action | Priority |
|---|---|---|---|
| ip_dest = 50.8.3.0 | 0xFFFFFF00 | setfield:dmac = 28-6e-d4-88-d3-e1 output:port = E0/2 | 5197 |

First, a destination address 50.8.3.0 is extracted, and 50.8.3.0 is used as a destination IP address ip_dest=50.8.3.0 in the match field in the OpenFlow flow entry shown in Table 4. The mask is 24, representing high 24 bits of a matched destination address. Correspondingly, a hexadecimal mask 0xFFFFFF00 that represents high 24 bits of a matched destination address and that corresponds to 24 is used as a match field mask in the OpenFlow flow entry shown in Table 4.

Second, it is checked that the protocol in the routing entry is OSPF, and is not of a direct connection type (Direct). In Table 3, the second routing entry, that is, the routing entry in which a destination address/a mask is 40.0.0.0/24, is obtained, and it is determined that the protocol in the routing entry is not of a direct connection type. In Table 3, the third routing entry, that is, a routing entry in which a destination address/a mask is 20.0.0.0/24, is obtained, and it is determined that the protocol in the third routing entry is of a direct connection type. According to Table 1, a MAC address corresponding to a next-hop address 20.0.0.1 in the third routing entry is used as a MAC address for the action, modify a MAC address setfield:dmac=28-6e-d4-88-d3-e1, and an outbound port E0/2 in the routing entry is used a specified port for the action, output to a specified port output:port=E0/2.

Finally, it is assumed that X=3, Y=6, and Z=7. It can be known from Table 3 by means of traversing that there is no routing entry matching the routing entry in which the destination address is 50.8.3.0; then, a number of the routing entry in which the destination address is 50.8.3.0 is 0 after sequencing, and correspondingly, an X-bit binary number is 000. As can be known from Table 2, an OpenFlow mapping value corresponding to a priority 10 in the routing entry is 40, and a Y-bit binary number is 101000; an OpenFlow mapping value corresponding to a metrics value 50 in the routing entry is 127−50=77, and a Z-bit binary number is 1001101. Then, a 16-bit binary number obtained after the combination is 0001010001001101, a decimal number obtained after conversion is 5197, and it is determined that the priority in the OpenFlow flow entry is 5197.

(2): The routing and switching information table is the layer 2 MAC address forwarding table.

The layer 2 MAC address forwarding table includes at least one forwarding entry, and the forwarding entry includes a MAC address, a virtual network identifier VLAN ID, and an outbound port; and correspondingly, the converting, according to routing and switching information in each routing and switching information table, the routing and switching information table into an OpenFlow flow table corresponding to the routing and switching information table includes:

converting, according to the MAC address, the virtual network identifier VLAN ID, and the outbound port that are included in the forwarding entry in the layer 2 MAC address forwarding table, each forwarding entry into a second OpenFlow flow entry that corresponds to the forwarding entry and that includes a match field and an action, where the OpenFlow flow entry forms a flow table, the OpenFlow flow entry includes the match field and the action, the match field in the OpenFlow flow entry includes a MAC address and a VLAN ID, and the action in the OpenFlow flow entry includes output to a specified port.

Preferably, for a first forwarding entry, converting the first forwarding entry into a second OpenFlow flow entry corresponding to the first forwarding entry includes:

using a MAC address in the first forwarding entry as a MAC address in a match field in the second OpenFlow flow entry, where the first forwarding entry is any forwarding entry in the layer 2 MAC address forwarding table;

using a VLAN ID in the first forwarding entry as a VLAN ID in the match field in the second OpenFlow flow entry; and using an outbound port in the first forwarding entry as a specified port for an action, output to a specified port, in the second OpenFlow flow entry.

The following specifically describes the foregoing method by using Table 5 and Table 6 as an example.

For example, Table 5 is a layer 2 MAC address forwarding table. If a forwarding entry in which a MAC address is 0008-740c-6bb8 in Table 5 is converted into an OpenFlow flow entry (as shown in Table 6) corresponding to the forwarding entry, the MAC address 0008-740c-6bb8 in the forwarding entry needs to be directly used as a MAC address=0008-740c-6bb8 in a match field in the OpenFlow flow entry, VLAN ID101 is directly used as a VLAN ID=101 in the OpenFlow flow entry, and an outbound port E0/1 is directly used as a specified port for an action, output to a specified port output:port=E0/1, in the OpenFlow flow entry.

TABLE 5

| MAC address | VALN ID | Outbound port |
|---|---|---|
| 00e0-fc09-bcf9 | 1 | E0/1 |
| 00e0-fc20-ea3e | 1 | E0/1 |
| 0008-740c-6bb8 | 101 | E0/1 |
| 000e-0c6f-6e82 | 101 | E0/1 |

TABLE 6

| Match field | Action |
|---|---|
| MAC address = 0008-740c-6bb8VLAN ID = 101 | output:port = E0/1 |

203: The switch switches to the OpenFlow switching mode, and sends a mode switch response message to the controller.

The mode switch response message is used to notify the controller that the switch successfully switches from the conventional switching mode to the OpenFlow switching mode, so that the controller reads the OpenFlow flow table and performs global network topology control and optimization.

Further, before the receiving, by a switch, a mode switch request message sent by a controller, the method further includes:

receiving, by the switch, a mode query instruction sent by the controller, where the mode query instruction is used to query a current mode of the switch; and sending, by the switch, a mode response message including the current mode to the controller, so that when the controller detects that a current network quality parameter is within a preset threshold and the current mode is the conventional switching mode, the controller sends the mode switch request message to the switch.

The preset threshold is set by a system according to requirements, which is not limited in this embodiment of the present invention. That the current network quality parameter is within the preset threshold represents that current network quality performance is unstable, a data transmission rate is low, and the like.

Further, when a connection between the switch and the controller resumes, the method further includes:

freezing, by the switch, all routing and switching information tables of the switch in the conventional switching mode, and converting, according to routing and switching information in each routing and switching information table, the routing and switching information table into an OpenFlow flow table corresponding to the routing and switching information table, so that the controller reads the OpenFlow flow table and performs global network topology control and optimization.

In this way, when the connection between the switch and the controller resumes, the switch automatically switches from the conventional switching mode to the OpenFlow switching mode.

Opposite to a case in which the switch switches from a conventional working mode to an OpenFlow working mode, in an OpenFlow network, the switch may switch from the OpenFlow switching mode to the conventional switching mode by using the following method (1) or (2):

(1): The switch sends a connection request to the controller.

If a time of sending the connection request is greater than a time threshold, the switch switches from the OpenFlow mode to the conventional switching mode.

The preset time threshold is set according to requirements, which is not limited in this embodiment of the present invention. By means of this method, the switch automatically switches to the conventional switching mode, thereby improving usability of the switch.

(2): The switch receives a mode query instruction sent by the controller, where the mode query instruction is used to query a current mode of the switch;

the switch sends a mode response message including the current mode of the switch to the controller, so that when the controller detects that a switch except the switch in the OpenFlow network is faulty, the controller sends a mode switching instruction to all switches in the OpenFlow network, where the current mode is the OpenFlow switching mode; and the switch receives the mode switching instruction sent by the controller, and switches from the OpenFlow switching mode to the conventional switching mode, where the mode switching instruction is used to instruct the switch to switch from the OpenFlow switching mode to the conventional switching mode.

In this way, when a problem occurs in a network plane of the OpenFlow (that is, some switches are faulty), the controller actively delivers the mode switching instruction, implementing an application scenario in which the entire OpenFlow network is switched to the conventional network.

In the mode switching method provided in this embodiment of the present invention, after a connection between a switch and a controller resumes, the switch receives a mode switch request message that is sent by the controller and that is used to request the switch to switch from a conventional switching mode to an OpenFlow switching mode; the switch starts to freeze all routing and switching information tables of the switch in the conventional switching mode, and converts, according to routing and switching information in each routing and switching information table, the routing and switching information table into an OpenFlow flow table corresponding to the routing and switching information table; and the switch switches to the OpenFlow switching mode, and sends a mode switch response message to the controller. In this way, when the switch switches from the conventional switching mode to the OpenFlow switching mode, a routing and switching information table in the conventional switching mode is converted into an OpenFlow flow table corresponding to the routing and switching information table, so that routing and switching information in the conventional switching mode is represented in a form of OpenFlow flow table.

Further, when continuity of a network service is ensured, the controller can view, by using a converted OpenFlow flow table corresponding to the routing and switching information, the routing and switching information that is in the conventional mode and that is stored in the switch, and obtain current network topology information by using the conventional routing and switching information, so that when the switch switches from the conventional switching mode to the OpenFlow switching mode, when the network service is not interrupted, the controller obtains the current network topology information by using the conventional routing and switching information, and performs global network topology control and optimization.

Embodiment 2

Figure 3:
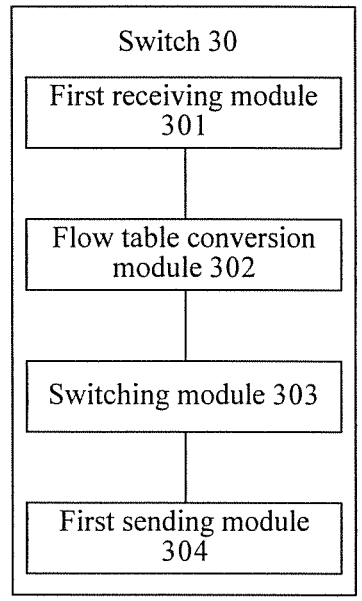
FIG. 3 is a structural diagram of a switch 30 according to an embodiment of the present invention.

FIG. 3 is a structural diagram of a switch 30 according to this embodiment of the present invention. The switch 30 supports two working modes: conventional switching and OpenFlow (OpenFlow) switching. A current working mode of the switch 30 is the conventional switching mode, that is, the switch creates a network topology by means of the conventional layer 2 forwarding technology or layer 3 routing protocol, and sends a data packet to a corresponding port according to the network topology. As shown in FIG. 3, the switch 30 includes:

a first receiving module 301, configured to receive a mode switch request message sent by a controller, where the mode switch request message is used to instruct the switch to switch from a conventional switching mode to an OpenFlow switching mode;

a flow table conversion module 302, configured to: when the first receiving module receives the mode switch request message, freeze all routing and switching information tables of the switch in the conventional switching mode, and convert, according to routing and switching information in each routing and switching information table, the routing and switching information table into an OpenFlow flow table corresponding to the routing and switching information table, where the OpenFlow flow table includes at least one OpenFlow flow entry;

a switching module 303, configured to switch the switch to the OpenFlow switching mode; and a first sending module 304, configured to send a mode switch response message to the controller.

The mode switch response message is used to notify the controller that the switch successfully switches from the conventional switching mode to the OpenFlow switching mode, so that the controller reads the OpenFlow flow table and performs global network topology control and optimization.

When the switch is in the conventional switching mode, data forwarding between switches needs to be implemented by means of a layer 3 IP address routing table created by means of the routing protocol such as the Open Shortest Path First (OSPF), or by means of routing and switching information in a layer 2 MAC address forwarding table created by means of MAC address learning. Therefore, the routing and switching information table generated in the conventional switching mode may be the layer 3 IP address routing table and/or layer 2 MAC address forwarding table.

(1): The routing and switching information table is the layer 3 IP address routing table.

The layer 3 IP address routing table may include at least one routing entry, and each routing entry includes a destination address, a mask, a protocol, a priority, a metrics value, a next-hop address, and an outbound port, and correspondingly, the flow table conversion module 302 is specifically configured to:

convert, according to the destination address, the mask, the protocol, the priority, the metrics value, the next-hop address, and the outbound port that are included in the routing entry in the layer 3 IP address routing table, each routing entry in the layer 3 IP address routing table into an OpenFlow flow entry corresponding to the routing entry, where the OpenFlow flow entry forms an OpenFlow flow table, the OpenFlow flow entry includes a match field, a match field mask, an action, and a priority, the match field in the OpenFlow flow entry includes a destination IP address, and the action in the OpenFlow flow entry includes: modify a destination MAC address and output to a specified port.

The match field in the OpenFlow flow entry is used to perform matching on content of a packet header in a data packet received by the switch, is defined by the OpenFlow protocol, supports abundant packet match fields, and supports an Internet Protocol (IP) address mask, including a subnet mask or any mask. Each match field has a priority, and packet matching needs to be performed according to a sequence of priorities of match fields. The match field may include one or more of a switch port (switch port), a virtual network identifier (VLAN ID), a source MAC address, a destination MAC address, an Ethernet type, a source IP address, a destination IP address, an IP protocol, a Transmission Control Protocol (TCPP) source port, or a TCP target port.

The action in the OpenFlow flow entry is used to indicate, to the switch, how to process, after a matched data packet is received, the data packet, including modifying a destination MAC address of the data packet, and/or outputting the data packet to a specified port.

Preferably, for a first routing entry (the first routing entry is any routing entry in the layer 3 IP address routing table), the flow table conversion module 302 is specifically configured to:

(a): Use a destination address in the first routing entry as a destination IP address in a match field in a first OpenFlow flow entry.

For example, if the destination address in the first routing entry is 50.8.0.0, the destination IP address in the match field in the first OpenFlow flow entry corresponding to the routing entry is 50.8.0.0.

(b): Determine a match field mask in the first OpenFlow flow entry according to a mask in the first routing entry.

For example, if the mask in the first routing entry is 8, it represents high eight bits of a matched destination address, and correspondingly, 0xFF000000 is used as the match field mask in the first OpenFlow flow entry.

(c): Determine an action, modify destination MAC, in the first OpenFlow flow entry according to a protocol in the first routing entry or a protocol in a second routing entry.

The second routing entry is in the layer 3 IP address routing table, and a result obtained after an AND operation is performed on a destination address in the second routing entry and a mask in the second routing entry is equal to a result obtained after an AND operation is performed on a next-hop address in the first routing entry and the mask in the second routing entry.

(d): Use an outbound port in the first routing entry as a specified port for an action, output to a specified port, in the first OpenFlow flow entry.

For example, if the outbound port in the first routing entry is E0/2, the specified port for the action, output to a specified port, in the first OpenFlow flow entry corresponding to the first routing entry is E0/2.

(e): Determine a priority in the first OpenFlow flow entry according to a priority in the first routing entry, a metrics value in the first routing entry, and a number of the first routing entry.

The number of the first routing entry is a number obtained after the first routing entry and all matched entries of the first routing entry are sequenced in ascending order of lengths of masks. The matched entry of the first routing entry is a routing entry that is in the layer 3 IP address routing table and in which a result obtained after a bitwise AND operation is performed on a destination address in the routing entry and a mask in the routing entry is the same as a result obtained after an AND operation is performed on the destination address in the first routing entry and the mask in the routing entry.

For example, if the destination address/the mask in the first routing entry is 50.8.3.0/24 and the mask is 24, in the layer 3 IP address routing table, a matched entry of the first routing entry is a routing entry in which a destination address/a mask is 50.8.0.0/16, and routing entries of 50.8.3.0/24 and 50.8.0.0/16 are sequenced in ascending order of lengths of masks. Because the mask 24 is greater than the mask 16, a result obtained after sequencing is: a number of the routing entry corresponding to 50.8.3.0/24 is 1, and a number of the routing entry corresponding to 50.8.0.0/16 is 0.

If in the layer 3 IP address routing table, the matched entries of the first routing entry are a routing entry in which a destination address/a mask is 50.8.0.0/16 and a routing entry in which a destination address/a mask is 50.0.0.0/8, and a result obtained after 50.8.3.0/24, 50.8.0.0/16, 50.0.0.0/8 are sequenced is 2, 1, 0, it is determined that the number of the first routing entry of 50.8.3.0/24 is 2.

Further, the flow table conversion module 302 is specifically configured to:

check the protocol in the first routing entry, to determine whether the protocol in the first routing entry is of a direct connection type; and if yes, use a MAC address corresponding to the next-hop address in the first routing entry as a destination MAC address for the action, modify destination MAC, in the OpenFlow flow entry; or if not, check whether there is the second routing entry in the layer 3 IP address routing table; if there is the second routing entry, determine whether the protocol in the second routing entry is of a direct connection type; and if the protocol in the second routing entry is of a direct connection type, use a MAC address corresponding to the next-hop address in the first routing entry as a destination MAC address for the action, modify destination MAC, in the OpenFlow flow entry; or if the protocol in the second routing entry is not of a direct connection type, check whether there is a third routing entry in the layer 3 IP address routing table; if there is the third routing entry, determine whether a protocol in the third routing entry is of a direct connection type; and if the protocol in the third routing entry is of a direct connection type, use a MAC address corresponding to a next-hop address in the third routing entry as a destination MAC address for the action, modify destination MAC, in the OpenFlow flow entry, where a result obtained after an AND operation is performed on a destination address in the third routing entry and a mask in the third routing entry is equal to a result obtained after an AND operation is performed on a next-hop address in the second routing entry and the mask in the third routing entry.

The MAC address corresponding to the next-hop address needs to be obtained by searching an address resolution protocol (ARP) table prestored in the switch, and the ARP table is used to describe a correspondence among an IP address, a MAC address, and an outbound port. For example, Table 1 is an ARP table. If a next-hop address in a routing entry is 40.0.0.2, it can be known from Table 1 that a MAC address corresponding to 40.0.0.2 is 28-6e-d4-88-d1-ae; therefore, 28-6e-d4-88-d1-ae is used as a destination MAC address for an action, modify destination MAC, in an OpenFlow flow entry.

It should be noted that, if there is no second routing entry, the first routing entry is not converted into the first OpenFlow flow entry; or if there is no third routing entry, the first routing entry is not converted into the first OpenFlow flow entry.

Further, the flow table conversion module 302 is specifically configured to:

obtain, according to a preset correspondence between a priority in a routing entry and an OpenFlow mapping value, an OpenFlow mapping value corresponding to the priority in the first routing entry, and obtain, according to a preset correspondence between a metrics value in a routing entry and an OpenFlow mapping value, an OpenFlow mapping value corresponding to the metrics value in the first routing entry;

perform weighting on the number of the first routing entry according to a first preset weighting value, perform, according to a second preset weighting value, weighting on the OpenFlow mapping value corresponding to the priority in the first routing entry, and perform, according to a third preset weighting value, weighting on the OpenFlow mapping value corresponding to the metrics values in the first routing entry;

add a weighting result of the number of the first routing entry, a weighting result of the OpenFlow mapping value corresponding to the priority in the first routing entry, and a weighting result of the OpenFlow mapping value corresponding to the metrics value in the first routing entry; and use an added result as the priority in the first OpenFlow flow entry.

The correspondence between a priority in a routing entry and an OpenFlow mapping value may be preset according to a rule that a larger value of a priority in a routing entry indicates a smaller corresponding OpenFlow mapping value. For example, Table 2 is a table of the correspondence between a priority in a routing entry and an OpenFlow mapping value. As shown in Table 2, when a priority is 0, a corresponding OpenFlow mapping value is 63; and when a priority is 256, a corresponding OpenFlow mapping value is 1.

It should be noted that the correspondence between a priority in a routing entry and an OpenFlow mapping value needs to be set according to only a rule that a larger value of a priority in a routing entry indicates a smaller corresponding OpenFlow mapping value, an OpenFlow mapping value corresponding to a priority is variable, and a specific value may be set according to requirements, which is not limited in this embodiment of the present invention.

The correspondence between a metrics value in a routing entry and an OpenFlow mapping value may be set to: 127−metrics value. For example, if a metrics value in a routing entry is 50, an OpenFlow mapping value corresponding to the metrics value is 127−50=77.

It should be noted that the first preset weighting value is greater than the second preset weighting value and the second weighting value is greater than the third preset weighting value. That is, when the priority in the first OpenFlow flow entry is determined, a proportion of the number of the first routing entry is the largest, a proportion of the priority in the first routing entry is the second largest, and a proportion of the metrics value in the first routing entry is the smallest, where specific values of the first preset weighting value, the second weighting value, and the third preset weighting value are preset according to requirements, which is not limited in this embodiment of the present invention.

For example, if the number of the first routing entry is 2, the OpenFlow mapping value corresponding to the priority in the first routing entry is 10, the OpenFlow mapping value corresponding to the metrics value in the first routing entry is 55, the first weighting value is 512, the second preset weighting value is 8, and the third preset weighting value is 1, the priority in the first OpenFlow flow entry is: 2×512+10×8+55×1=1159.

Further, the flow table conversion module 302 is specifically configured to:

perform Y-bit binary conversion on the OpenFlow mapping value corresponding to the priority in the first routing entry, perform Z-bit binary conversion on the OpenFlow mapping value corresponding to the metrics values in the first routing entry, and perform X-bit binary conversion on the number of the first routing entry, where $X+Y+Z=16$, X is greater than or equal to 3, $2^Y$ is greater than or equal to an OpenFlow mapping value corresponding to the smallest priority in the routing entry in the preset correspondence between a priority in a routing entry and an OpenFlow mapping value, and $2^Z$ is greater than or equal to 127;

sequence an X-bit binary number, a Y-bit binary number, and a Z-bit binary number in descending order to form a 16-bit binary number; and perform binary to decimal conversion on the 16-bit binary number, and use a value obtained after the conversion as the priority in the first OpenFlow flow entry.

For example, the number of the first routing entry is 0 and is converted into an X-bit binary number 000; an OpenFlow mapping value corresponding to the priority 100 in the first routing entry is 20, and is converted into a Y-bit binary number 010100; a metrics value in the first routing entry is 10, and a corresponding OpenFlow value is $127-10=117$, and is converted into a Z-bit binary number 1110101. The X-bit binary number, the Y-bit binary number, and the Z-bit binary number are sequenced in descending order to obtain: 0000101001110101, a decimal number obtained after the conversion is $2^0+2^2+2^4+2^5+2^6+2^9+2^{11}=2677$, and the priority in the first OpenFlow flow entry is 2677.

(2): The routing and switching information table is the layer 2 MAC address forwarding table.

The layer 2 MAC address forwarding table includes at least one forwarding entry, and the forwarding entry includes a MAC address, a virtual network identifier VLAN ID, and an outbound port; and correspondingly, the flow table conversion module 302 is specifically configured to:

convert, according to a MAC address, a virtual network identifier VLAN ID, and an outbound port that are included in a first forwarding entry in the layer 2 MAC address forwarding table, the first forwarding entry into a second OpenFlow flow entry, where a match field in the second OpenFlow flow entry includes a MAC address and a VLAN ID, and an action includes output to a specified port.

Further, for the first forwarding entry, the flow table conversion module 302 is specifically configured to:

use the MAC address in the first forwarding entry as the MAC address in the match field in the second OpenFlow flow entry, where the first forwarding entry is any forwarding entry in the layer 2 MAC address forwarding table;

use the VLAN ID in the first forwarding entry as the VLAN ID in the match field in the second OpenFlow flow entry; and use the outbound port in the first forwarding entry as a specified port for the action, output to a specified port, in the second OpenFlow flow entry.

For example, Table 5 is a layer 2 MAC address forwarding table. If a forwarding entry in which a MAC address is 0008-740c-6bb8 in Table 5 is converted into an OpenFlow flow entry (as shown in Table 6) corresponding to the forwarding entry, the MAC address 0008-740c-6bb8 in the forwarding entry needs to be directly used as a MAC address=0008-740c-6bb8 in a match field in the OpenFlow flow entry, VLAN ID101 is directly used as a VLAN ID=101 in the OpenFlow flow entry, and an outbound port E0/1 is directly used as a specified port for an action, output to a specified port output:port=E0/1, in the OpenFlow flow entry.

Figure 3A:
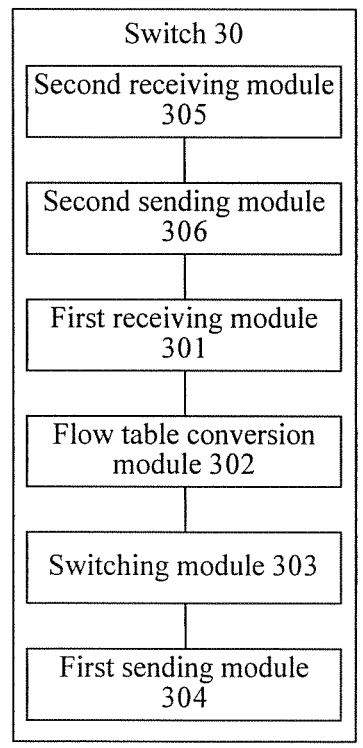
FIG. 3A is a structural diagram of a switch 30 according to an embodiment of the present invention.

Further, as shown in FIG. 3A, the switch 30 further includes:

a second receiving module 305, configured to: before the first receiving module 301 receives the mode switch request message sent by the controller, receive a mode query instruction sent by the controller, where the mode query instruction is used to query a current mode of the switch; and a second sending module 306, configured to send a mode response message including the current mode to the controller, so that when the controller detects that a current network quality parameter is within a preset threshold and the current mode is the conventional switching mode, the controller sends the mode switch request message to the switch.

Further, the first sending module 301 is further configured to send a connection request to the controller; and the switching module 303 is further configured to: if a time of sending the connection request is greater than a preset time threshold, switch from the OpenFlow mode to the conventional switching mode.

The preset time threshold is set according to requirements, which is not limited in this embodiment of the present invention. By means of this method, the switch automatically switches to the conventional switching mode, thereby improving usability of the switch.

Further, the second receiving module 305 is further configured to receive the mode query instruction sent by the controller, where the mode query instruction is used to query the current mode of the switch;

the second sending module 306 is further configured to send the mode response message including the current mode of the switch to the controller, so that when the controller detects that a switch except the switch in the OpenFlow network is faulty, the controller sends a mode switching instruction to all switches in the OpenFlow network, where the current mode is the OpenFlow switching mode;

the first receiving module 301 is further configured to receive the mode switching instruction sent by the controller, where the mode switching instruction is used to instruct the switch to switch from the OpenFlow switching mode to the conventional switching mode; and the switching module 303 is further configured to switch from the OpenFlow switching mode to the conventional switching mode.

In this way, when a problem occurs in a network plane of the OpenFlow (that is, some switches are faulty), the controller actively delivers the mode switching instruction, implementing an application scenario in which the entire OpenFlow network is switched to the conventional network.

In the switch 30 provided in this embodiment of the present invention, after a connection between the switch and a controller resumes, the switch receives a mode switch request message that is sent by the controller and that is used to request the switch to switch from a conventional switching mode to an OpenFlow switching mode; the switch starts to freeze all routing and switching information tables of the switch in the conventional switching mode, and converts, according to routing and switching information in each routing and switching information table, the routing and switching information table into an OpenFlow flow table corresponding to the routing and switching information table; the switch switches to the OpenFlow switching mode, and sends a mode switch response message to the controller. In this way, when the switch switches from the conventional switching mode to the OpenFlow switching mode, a routing and switching information table in the conventional switching mode is converted into an OpenFlow flow table corresponding to the routing and switching information table, so that routing and switching information in the conventional switching mode is represented in a form of OpenFlow flow table.

Further, when continuity of a network service is ensured, the controller can view, by using a converted OpenFlow flow table corresponding to the routing and switching information, the routing and switching information that is in the conventional mode and that is stored in the switch, and obtain current network topology information by using the conventional routing and switching information, so that when the switch switches from the conventional switching mode to the OpenFlow switching mode, when the network service is not interrupted, the controller obtains the current network topology information by using the conventional routing and switching information, and performs global network topology control and optimization.

Embodiment 3

Figure 4:
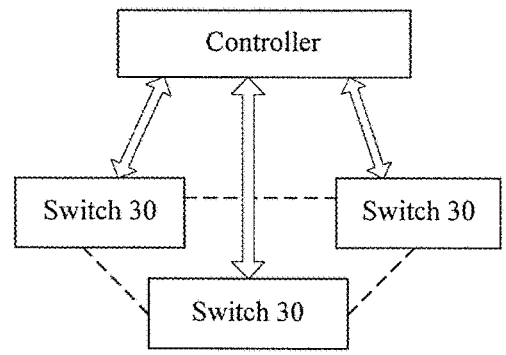
FIG. 4 is a structural diagram of a switch mode switching system according to an embodiment of the present invention.

FIG. 4 is a switch mode switching system according to this embodiment of the present invention. The system includes at least two switches 30 and a controller.

The controller is configured to control the switches in a centralized manner. The switches 30 have a function the same as that of the switch 30 in Embodiment 2, and details are not described herein again.

In the switch mode switching system provided in this embodiment of the present invention, after a connection between a switch and a controller resumes, the switch 30 receives a mode switch request message that is sent by the controller and that is used to request the switch to switch from a conventional switching mode to an OpenFlow switching mode; the switch starts to freeze all routing and switching information tables of the switch in the conventional switching mode, and converts, according to routing and switching information in each routing and switching information table, the routing and switching information table into an OpenFlow flow table corresponding to the routing and switching information table; and the switch switches to the OpenFlow switching mode, and sends a mode switch response message to the controller. In this way, when the switch switches from the conventional switching mode to the OpenFlow switching mode, a routing and switching information table in the conventional switching mode is converted into an OpenFlow flow table corresponding to the routing and switching information table, so that routing and switching information in the conventional switching mode is represented in a form of OpenFlow flow table.

Further, when continuity of a network service is ensured, the controller can view, by using a converted OpenFlow flow table corresponding to the routing and switching information, the routing and switching information that is in the conventional mode and that is stored in the switch, and obtain current network topology information by using the conventional routing and switching information, so that when the switch switches from the conventional switching mode to the OpenFlow switching mode, when the network service is not interrupted, the controller obtains the current network topology information by using the conventional routing and switching information, and performs global network topology control and optimization.

Embodiment 4

Figure 5:
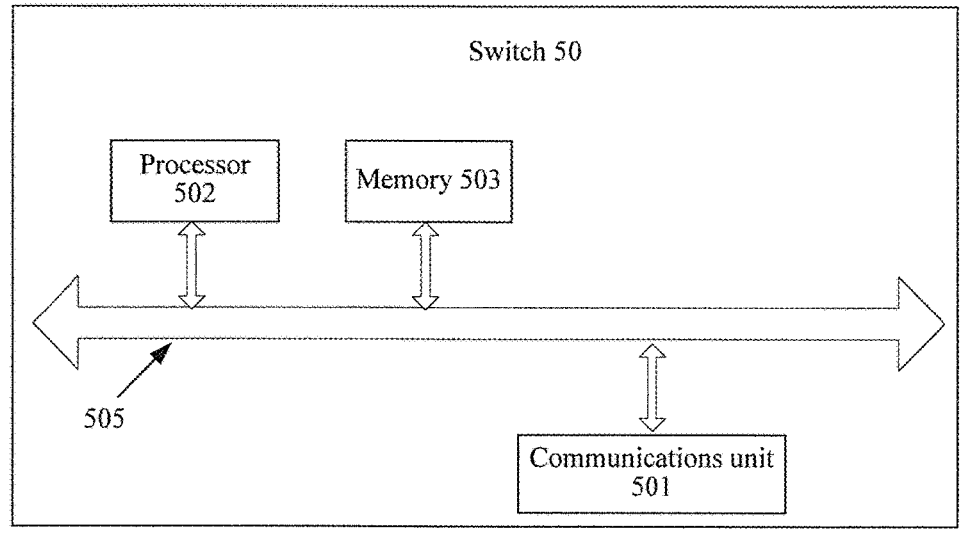
FIG. 5 is a structural diagram of a switch 50 according to an embodiment of the present invention.

FIG. 5 is a structural diagram of a switch 50 according to this embodiment of the present invention. The switch 50 supports two working modes: conventional switching and OpenFlow (OpenFlow) switching. A current working mode of the switch 50 is the conventional switching mode, that is, the switch creates a network topology by means of the conventional layer 2 forwarding technology or layer 3 routing protocol, and sends a data packet to a corresponding port according to the network topology. As shown in FIG. 5, the switch 50 may include a communications unit 501, a processor 502, a memory 503, and at least one communications bus 504, configured to implement connection and communication between apparatuses.

The communications unit 501 is configured to transmit data to an external network element.

The processor 502 may be a central processing unit (CPU).

The memory 503 may be a volatile memory (volatile memory), such as a random-access memory (RAM); or a non-volatile memory (non-volatile memory), such as a read-only memory (ROM), a flash memory (flash memory), a hard disk drive (HDD), or a solid-state drive (SSD); or a combination of the foregoing types of memories; and provide an instruction and data to the processor 901.

The communications unit 501 is configured to receive a mode switch request message sent by a controller, where the mode switch request message is used to instruct the switch to switch from a conventional switching mode to an Open-Flow switching mode.

The processor 502 is configured to: when the communications unit 501 receives the mode switch request message, freeze all routing and switching information tables of the switch in the conventional switching mode, and convert, according to routing and switching information in each routing and switching information table, the routing and switching information table into an OpenFlow flow table corresponding to the routing and switching information table, where the OpenFlow flow table includes at least one OpenFlow flow entry.

The processor 502 is further configured to switch the switch to the OpenFlow switching mode.

The communications unit 501 is further configured to send a mode switch response message to the controller.

The mode switch response message is used to notify the controller that the switch successfully switches from the conventional switching mode to the OpenFlow switching mode, so that the controller reads the OpenFlow flow table and performs global network topology control and optimization.

When the switch is in the conventional switching mode, data forwarding between switches needs to be implemented by means of a layer 3 IP address routing table created by means of the routing protocol such as the Open Shortest Path First (OSPF), or by means of routing and switching information in a layer 2 MAC address forwarding table created by means of MAC address learning. Therefore, the routing and switching information table generated in the conventional switching mode may be the layer 3 IP address routing table and/or layer 2 MAC address forwarding table.

(1): The routing and switching information table is the layer 3 IP address routing table.

The layer 3 IP address routing table may include at least one routing entry, and each routing entry includes a destination address, a mask, a protocol, a priority, a metrics value, a next-hop address, and an outbound port, and correspondingly, the processor 502 is specifically configured to:

convert, according to the destination address, the mask, the protocol, the priority, the metrics value, the next-hop address, and the outbound port that are included in the routing entry in the layer 3 IP address routing table, each routing entry in the layer 3 IP address routing table into an OpenFlow flow entry corresponding to the routing entry, where the OpenFlow flow entry forms an OpenFlow flow table, the OpenFlow flow entry includes a match field, a match field mask, an action, and a priority, the match field in the OpenFlow flow entry includes a destination IP address, and the action in the OpenFlow flow entry includes: modify a destination MAC address and output to a specified port.

The match field in the OpenFlow flow entry is used to perform matching on content of a packet header in a data packet received by the switch, is defined by the OpenFlow protocol, supports abundant packet match fields, and supports an Internet Protocol (IP) address mask, including a subnet mask or any mask. Each match field has a priority, and packet matching needs to be performed according to a sequence of priorities of match fields. The match field may include one or more of a switch port (switch port), a virtual network identifier (VLAN ID), a source MAC address, a destination MAC address, an Ethernet type, a source IP address, a destination IP address, an IP protocol, a Transmission Control Protocol (TCPP) source port, or a TCP target port.

The action in the OpenFlow flow entry is used to indicate, to the switch, how to process, after a matched data packet is received, the data packet, including modifying a destination MAC address of the data packet, and/or outputting the data packet to a specified port.

Further, for a first routing entry (the first routing entry is any routing entry in the layer 3 IP address routing table), the processor 502 is specifically configured to:

(a): Use a destination address in the first routing entry as a destination IP address in a match field in a first OpenFlow flow entry.

For example, if the destination address in the first routing entry is 50.8.0.0, the destination IP address in the match field in the first OpenFlow flow entry corresponding to the routing entry is 50.8.0.0.

(b): Determine a match field mask in the first OpenFlow flow entry according to a mask in the first routing entry.

For example, if the mask in the first routing entry is 8, it represents high eight bits of a matched destination address, and correspondingly, 0xFF000000 is used as the match field mask in the first OpenFlow flow entry.

(c): Determine an action, modify destination MAC, in the first OpenFlow flow entry according to a protocol in the first routing entry or a protocol in a second routing entry.

The second routing entry is in the layer 3 IP address routing table, and a result obtained after an AND operation is performed on a destination address in the second routing entry and a mask in the second routing entry is equal to a result obtained after an AND operation is performed on a next-hop address in the first routing entry and the mask in the second routing entry.

(d): Use an outbound port in the first routing entry as a specified port for an action, output to a specified port, in the first OpenFlow flow entry.

For example, if the outbound port in the first routing entry is E0/2, the specified port for the action, output to a specified port, in the first OpenFlow flow entry corresponding to the first routing entry is E0/2.

(e): Determine a priority in the first OpenFlow flow entry according to a priority in the first routing entry, a metrics value in the first routing entry, and a number of the first routing entry.

The number of the first routing entry is a number obtained after the first routing entry and all matched entries of the first routing entry are sequenced in ascending order of lengths of masks. The matched entry of the first routing entry is a routing entry that is in the layer 3 IP address routing table and in which a result obtained after a bitwise AND operation is performed on a destination address in the routing entry and a mask in the routing entry is the same as a result obtained after an AND operation is performed on the destination address in the first routing entry and the mask in the routing entry.

For example, if the destination address/the mask in the first routing entry is 50.8.3.0/24 and the mask is 24, in the layer 3 IP address routing table, a matched entry of the first routing entry is a routing entry in which a destination address/a mask is 50.8.0.0/16, and routing entries of 50.8.3.0/24 and 50.8.0.0/16 are sequenced in ascending order of lengths of masks. Because the mask 24 is greater than the mask 16, a result obtained after sequencing is: a number of the routing entry corresponding to 50.8.3.0/24 is 1, and a number of the routing entry corresponding to 50.8.0.0/16 is 0.

If in the layer 3 IP address routing table, the matched entries of the first routing entry are a routing entry in which a destination address/a mask is 50.8.0.0/16 and a routing entry in which a destination address/a mask is 50.0.0.0/8, and a result obtained after 50.8.3.0/24, 50.8.0.0/16, 50.0.0.0/8 are sequenced is 2, 1, 0, it is determined that the number of the first routing entry of 50.8.3.0/24 is 2.

Further, the processor 502 is specifically configured to:

check the protocol in the first routing entry, to determine whether the protocol in the first routing entry is of a direct connection type; and if yes, use a MAC address corresponding to the next-hop address in the first routing entry as a destination MAC address for the action, modify destination MAC, in the OpenFlow flow entry; or if not, check whether there is the second routing entry in the layer 3 IP address routing table; if there is the second routing entry, determine whether the protocol in the second routing entry is of a direct connection type; and if the protocol in the second routing entry is of a direct connection type, use a MAC address corresponding to the next-hop address in the first routing entry as a destination MAC address for the action, modify destination MAC, in the OpenFlow flow entry; or if the protocol in the second routing entry is not of a direct connection type, check whether there is a third routing entry in the layer 3 IP address routing table, and if there is the third routing entry, determine whether a protocol in the third routing entry is of a direct connection type; and if the protocol in the third routing entry is of a direct connection type, use a MAC address corresponding to a next-hop address in the third routing entry as a destination MAC address for the action, modify destination MAC, in the OpenFlow flow entry, where a result obtained after an AND operation is performed on a destination address in the third routing entry and a mask in the third routing entry is equal to a result obtained after an AND operation is performed on a next-hop address in the second routing entry and the mask in the third routing entry.

The MAC address corresponding to the next-hop address needs to be obtained by searching an address resolution protocol (ARP) table prestored in the switch, and the ARP table is used to describe a correspondence among an IP address, a MAC address, and an outbound port. For example, Table 1 is an ARP table. If a next-hop address in a routing entry is 40.0.0.2, it can be known from Table 1 that a MAC address corresponding to 40.0.0.2 is 28-6e-d4-88-d1-ae; therefore, 28-6e-d4-88-d1-ae is used as a destination MAC address for an action, modify destination MAC, in an OpenFlow flow entry.

It should be noted that, if there is no second routing entry, the first routing entry is not converted into the first OpenFlow flow entry; or if there is no third routing entry, the first routing entry is not converted into the first OpenFlow flow entry.

Further, the processor 502 is specifically configured to:

obtain, according to a preset correspondence between a priority in a routing entry and an OpenFlow mapping value, an OpenFlow mapping value corresponding to the priority in the first routing entry, and obtain, according to a preset correspondence between a metrics value in a routing entry and an OpenFlow mapping value, an OpenFlow mapping value corresponding to the metrics value in the first routing entry;

perform weighting on the number of the first routing entry according to a first preset weighting value, perform, according to a second preset weighting value, weighting on the OpenFlow mapping value corresponding to the priority in the first routing entry, and perform, according to a third preset weighting value, weighting on the OpenFlow mapping value corresponding to the metrics values in the first routing entry;

add a weighting result of the number of the first routing entry, a weighting result of the OpenFlow mapping value corresponding to the priority in the first routing entry, and a weighting result of the OpenFlow mapping value corresponding to the metrics value in the first routing entry; and use an added result as the priority in the first OpenFlow flow entry.

The correspondence between a priority in a routing entry and an OpenFlow mapping value may be preset according to a rule that a larger value of a priority in a routing entry indicates a smaller corresponding OpenFlow mapping value. For example, Table 2 is a table of the correspondence between a priority in a routing entry and an OpenFlow mapping value. As shown in Table 2, when a priority is 0, a corresponding OpenFlow mapping value is 63; and when a priority is 256, a corresponding OpenFlow mapping value is 1.

It should be noted that the correspondence between a priority in a routing entry and an OpenFlow mapping value needs to be set according to only a rule that a larger value of a priority in a routing entry indicates a smaller corresponding OpenFlow mapping value, an OpenFlow mapping value corresponding to a priority is variable, and a specific value may be set according to requirements, which is not limited in this embodiment of the present invention.

The correspondence between a metrics value in a routing entry and an OpenFlow mapping value may be set to: 127−metrics value. For example, if a metrics value in a routing entry is 50, an OpenFlow mapping value corresponding to the metrics value is 127−50=77.

It should be noted that the first preset weighting value is greater than the second preset weighting value and the second weighting value is greater than the third preset weighting value. That is, when the priority in the first OpenFlow flow entry is determined, a proportion of the number of the first routing entry is the largest, a proportion of the priority in the first OpenFlow flow entry is the second largest, and a proportion of the metrics value in the first routing entry is the smallest, where specific values of the first preset weighting value, the second weighting value, and the third preset weighting value are preset according to requirements, which is not limited in this embodiment of the present invention.

For example, if the number of the first routing entry is 2, the OpenFlow mapping value corresponding to the priority in the first routing entry is 10, the OpenFlow mapping value corresponding to the metrics value in the first routing entry is 55, the first weighting value is 512, the second preset weighting value is 8, and the third preset weighting value is 1, the priority in the first OpenFlow flow entry is: 2×512+10×8+55×1=1159.

Further, the processor 502 is specifically configured to:

perform Y-bit binary conversion on the OpenFlow mapping value corresponding to the priority in the first routing entry, perform Z-bit binary conversion on the OpenFlow mapping value corresponding to the metrics values in the first routing entry, and perform X-bit binary conversion on the number of the first routing entry, where X+Y+Z=16, X is greater than or equal to 3, $2^Y$ is greater than or equal to an OpenFlow mapping value corresponding to the smallest priority in the routing entry in the preset correspondence between a priority in a routing entry and an OpenFlow mapping value, and $2^Z$ is greater than or equal to 127;

sequence an X-bit binary number, a Y-bit binary number, and a Z-bit binary number in descending order to form a 16-bit binary number; and perform binary to decimal conversion on the 16-bit binary number, and use a value obtained after the conversion as the priority in the first OpenFlow flow entry.

For example, the number of the first routing entry is 0 and is converted into an X-bit binary number 000; an OpenFlow mapping value corresponding to the priority 100 in the first routing entry is 20, and is converted into a Y-bit binary number 010100; a metrics value in the first routing entry is 10, and a corresponding OpenFlow value is 127−10=117, and is converted into a Z-bit binary number 1110101. The X-bit binary number, the Y-bit binary number, and the Z-bit binary number are sequenced in descending order to obtain: 0000101001110101, a decimal number obtained after the conversion is $2^0+2^2+2^4+2^5+2^6+2^9+2^{11}=2677$, and the priority in the first OpenFlow flow entry is 2677.

(2): The routing and switching information table is the layer 2 MAC address forwarding table.

The layer 2 MAC address forwarding table includes at least one forwarding entry, and the forwarding entry includes a MAC address, a virtual network identifier VLAN ID, and an outbound port; and correspondingly, the processor 502 is specifically configured to:

convert, according to a MAC address, a virtual network identifier VLAN ID, and an outbound port that are included in a first forwarding entry in the layer 2 MAC address forwarding table, the first forwarding entry into a second OpenFlow flow entry, where a match field in the second OpenFlow flow entry includes a MAC address and a VLAN ID, and an action includes output to a specified port.

Further, for the first forwarding entry, the processor 502 is specifically configured to:

use the MAC address in the first forwarding entry as the MAC address in the match field in the second OpenFlow flow entry, where the first forwarding entry is any forwarding entry in the layer 2 MAC address forwarding table;

use the VLAN ID in the first forwarding entry as the VLAN ID in the match field in the second OpenFlow flow entry; and use the outbound port in the first forwarding entry as a specified port for the action, output to a specified port, in the second OpenFlow flow entry.

For example, Table 5 is a layer 2 MAC address forwarding table. If a forwarding entry in which a MAC address is 0008-740c-6bb8 in Table 5 is converted into an OpenFlow flow entry (as shown in Table 6) corresponding to the forwarding entry, the MAC address 0008-740c-6bb8 in the forwarding entry needs to be directly used as a MAC address=0008-740c-6bb8 in a match field in the OpenFlow flow entry, VLAN ID101 is directly used as a VLAN ID=101 in the OpenFlow flow entry, and an outbound port E0/1 is directly used as a specified port for an action, output to a specified port output:port=E0/1, in the OpenFlow flow entry.

Further, the communications unit 501 is further configured to receive a mode query instruction sent by the controller, where the mode query instruction is used to query a current mode of the switch; and send a mode response message including the current mode to the controller, so that when the controller detects that a current network quality parameter is within a preset threshold and the current mode is the conventional switching mode, the controller sends the mode switch request message to the switch.

Further, the communications unit 501 is further configured to send a connection request to the controller; and the processor 502 is further configured to: if a time of sending the connection request is greater than a preset time threshold, switch from the OpenFlow mode to the conventional switching mode.

The preset time threshold is set according to requirements, which is not limited in this embodiment of the present invention. By means of this method, the switch automatically switches to the conventional switching mode, thereby improving usability of the switch.

Further, the communications unit 501 is further configured to receive the mode query instruction sent by the controller, where the mode query instruction is used to query the current mode of the switch;

send the mode response message including the current mode of the switch to the controller, so that when the controller detects that a switch except the switch in the OpenFlow network is faulty, the controller sends a mode switching instruction to all switches in the OpenFlow network, where the current mode is the OpenFlow switching mode; and receive the mode switching instruction sent by the controller, where the mode switching instruction is used to instruct the switch to switch from the OpenFlow switching mode to the conventional switching mode; and the processor 502 is further configured to switch from the OpenFlow switching mode to the conventional switching mode.

In this way, when a problem occurs in a network plane of the OpenFlow (that is, some switches are faulty), the controller actively delivers the mode switching instruction, implementing an application scenario in which the entire OpenFlow network is switched to the conventional network.

In the switch 50 provided in this embodiment of the present invention, after a connection between the switch and a controller resumes, the switch receives a mode switch request message that is sent by the controller and that is used to request the switch to switch from a conventional switching mode to an OpenFlow switching mode; the switch starts to freeze all routing and switching information tables of the switch in the conventional switching mode, and converts, according to routing and switching information in each routing and switching information table, the routing and switching information table into an OpenFlow flow table corresponding to the routing and switching information table; and the switch switches to the OpenFlow switching mode, and sends a mode switch response message to the controller. In this way, when the switch switches from the conventional switching mode to the OpenFlow switching mode, a routing and switching information table in the conventional switching mode is converted into an OpenFlow flow table corresponding to the routing and switching information table, so that routing and switching information in the conventional switching mode is represented in a form of OpenFlow flow table.

Further, when continuity of a network service is ensured, the controller can view, by using a converted OpenFlow flow table corresponding to the routing and switching information, the routing and switching information that is in the conventional mode and that is stored in the switch, and obtain current network topology information by using the conventional routing and switching information, so that when the switch switches from the conventional switching mode to the OpenFlow switching mode, when the network service is not interrupted, the controller obtains the current network topology information by using the conventional routing and switching information, and performs global network topology control and optimization.

Embodiment 5

Figure 6:
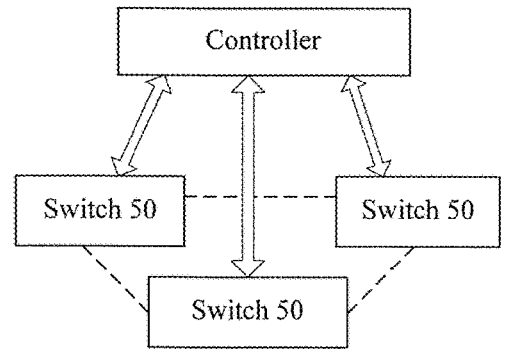
FIG. 6 is a structural diagram of a switch mode switching system according to an embodiment of the present invention.

FIG. 6 is a switch mode switching system according to this embodiment of the present invention. The system includes at least two switches 50 and a controller.

The controller is configured to control the switches in a centralized manner. The switches 50 have a function the same as that of the switch 50 in Embodiment 4, and details are not described herein again.

In the switch mode switching system provided in this embodiment of the present invention, after a connection between a switch and a controller resumes, the switch 50 receives a mode switch request message that is sent by the controller and that is used to request the switch to switch from a conventional switching mode to an OpenFlow switching mode; the switch starts to freeze all routing and switching information tables of the switch in the conventional switching mode, and converts, according to routing and switching information in each routing and switching information table, the routing and switching information table into an OpenFlow flow table corresponding to the routing and switching information table; and the switch switches to the OpenFlow switching mode, and sends a mode switch response message to the controller. In this way, when the switch switches from the conventional switching mode to the OpenFlow switching mode, a routing and switching information table in the conventional switching mode is converted into an OpenFlow flow table corresponding to the routing and switching information table, so that routing and switching information in the conventional switching mode is represented in a form of OpenFlow flow table.

Further, when continuity of a network service is ensured, the controller can view, by using a converted OpenFlow flow table corresponding to the routing and switching information, the routing and switching information that is in the conventional mode and that is stored in the switch, and obtain current network topology information by using the conventional routing and switching information, so that when the switch switches from the conventional switching mode to the OpenFlow switching mode, when the network service is not interrupted, the controller obtains the current network topology information by using the conventional routing and switching information, and performs global network topology control and optimization.

In the several embodiments provided in the present application, it should be understood that the disclosed system, mobile terminal, and method may be implemented in other manners. For example, the described mobile terminal embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the mobile terminals or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A switch mode switching method, comprising:
receiving, by a switch, a mode switch request message sent by a controller, wherein the mode switch request message is used to instruct the switch to switch from a conventional switching mode to an OpenFlow switching mode;
in response to the mode switch request message, freezing, by the switch, all routing and switching information tables of the switch in the conventional switching mode, and converting, according to routing and switching information in each routing and switching information table, the routing and switching information table into an OpenFlow flow table corresponding to the routing and switching information table, wherein the OpenFlow flow table comprises at least one OpenFlow flow entry; and
switching, by the switch, to the OpenFlow switching mode, and sending a mode switch response message to the controller.

2. The method according to claim 1, wherein:
the routing and switching information table is a layer 3 IP address routing table comprising at least one routing entry, and each routing entry comprises a destination address, a mask, a protocol, a priority, a metrics value, a next-hop address, and an outbound port; and
converting, according to routing and switching information in each routing and switching information table, the routing and switching information table into an OpenFlow flow table corresponding to the routing and switching information table comprises:
converting, according to the destination address, the mask, the protocol, the priority, the metrics value, the next-hop address, and the outbound port that are comprised in the routing entry in the layer 3 IP address routing table, each routing entry in the layer 3 IP address routing table into an OpenFlow flow entry corresponding to the routing entry, wherein the OpenFlow flow entry forms an OpenFlow flow table, the OpenFlow flow entry comprises a match field, a match field mask, an action, and a priority, the match field in the OpenFlow flow entry comprises a destination IP address, and the action in the OpenFlow flow entry comprises: modify a destination MAC address and output to a specified port.

3. The method according to claim 2, wherein for a first routing entry, converting the first routing entry into a first OpenFlow flow entry corresponding to the first routing entry comprises:
using a destination address in the first routing entry as a destination IP address in a match field in the first OpenFlow flow entry, wherein the first routing entry is any routing entry in the layer 3 IP address routing table;
determining a match field mask in the first OpenFlow flow entry according to a mask in the first routing entry;
determining an action, modify destination MAC, in the first OpenFlow flow entry according to a protocol in the first routing entry or a protocol in a second routing entry, wherein the second routing entry is in the layer 3 IP address routing table, and a result obtained after an AND operation is performed on a destination address in the second routing entry and a mask in the second routing entry is equal to a result obtained after an AND operation is performed on a next-hop address in the first routing entry and the mask in the second routing entry;
using an outbound port in the first routing entry as a specified port for an action, output to a specified port, in the first OpenFlow flow entry; and
determining a priority in the first OpenFlow flow entry according to a priority in the first routing entry, a metrics value in the first routing entry, and a number of the first routing entry, wherein the number of the first routing entry is a number obtained after the first routing entry and all matched entries of the first routing entry are sequenced in ascending order of lengths of masks, and a matched entry of the first routing entry is a routing entry that is in the layer 3 IP address routing table and in which a result obtained after a bitwise AND operation is performed on a destination address in the routing entry and a mask in the routing entry is equal to a result obtained after an AND operation is performed on the destination address in the first routing entry and the mask in the routing entry.

4. The method according to claim 3, wherein determining an action, modify destination MAC, in the first OpenFlow flow entry according to a protocol in the first routing entry or a protocol in a second routing entry comprises:

determining whether the protocol in the first routing entry is of a direct connection type;

if the protocol in the first routing entry is of a direct connection type, using the next-hop address in the first routing entry as a destination MAC address for the action, modify destination MAC, in the first OpenFlow flow entry; or if the protocol in the first routing entry is not of a direct connection type, obtaining the second routing entry from the layer 3 IP address routing table, and determining whether the protocol in the second routing entry is of a direct connection type; and if the protocol in the second routing entry is of a direct connection type, using a next-hop address in the second routing entry as a destination MAC address for the action, modify destination MAC, in the first OpenFlow flow entry.

5. The method according to claim 3, wherein determining a priority in the first OpenFlow flow entry according to a priority in the first routing entry, a metrics value in the first routing entry, and a number of the first routing entry comprises:

obtaining, according to a preset correspondence between a priority in a routing entry and an OpenFlow mapping value, an OpenFlow mapping value corresponding to the priority in the first routing entry, and obtaining, according to a preset correspondence between a metrics value in a routing entry and an OpenFlow mapping value, an OpenFlow mapping value corresponding to the metrics value in the first routing entry;

performing weighting on the number of the first routing entry according to a first preset weighting value, performing, according to a second preset weighting value, weighting on the OpenFlow mapping value corresponding to the priority in the first routing entry, and performing, according to a third preset weighting value, weighting on the OpenFlow mapping value corresponding to the metrics values in the first routing entry;

adding a weighting result of the number of the first routing entry, a weighting result of the OpenFlow mapping value corresponding to the priority in the first routing entry, and a weighting result of the OpenFlow mapping value corresponding to the metrics value in the first routing entry; and using an added result as the priority in the first OpenFlow flow entry.

6. The method according to claim 1, wherein:

the routing and switching information table is a layer 2 MAC address forwarding table comprising at least one forwarding entry, and the forwarding entry comprises a MAC address, a virtual network identifier VLAN ID, and an outbound port; and converting, according to routing and switching information in each routing and switching information table, the routing and switching information table into an OpenFlow flow table corresponding to the routing and switching information table comprises:

converting, according to the MAC address, the virtual network identifier VLAN ID, and the outbound port that are comprised in the forwarding entry in the layer 2 MAC address forwarding table, each forwarding entry into a second OpenFlow flow entry that corresponds to the forwarding entry and that comprises a match field and an action, wherein the OpenFlow flow entry forms a flow table, the OpenFlow flow entry comprises the match field and the action, the match field in the OpenFlow flow entry comprises a MAC address and a VLAN ID, and the action in the OpenFlow flow entry comprises output to a specified port.

7. The method according to claim 6, wherein for a first forwarding entry, converting the first forwarding entry into a second OpenFlow flow entry corresponding to the first forwarding entry comprises:

using a MAC address in the first forwarding entry as a MAC address in a match field in the second OpenFlow flow entry, wherein the first forwarding entry is any forwarding entry in the layer 2 MAC address forwarding table;

using a VLAN ID in the first forwarding entry as a VLAN ID in the match field in the second OpenFlow flow entry; and using an outbound port in the first forwarding entry as a specified port for an action, output to a specified port, in the second OpenFlow flow entry.

8. The method according to claim 1, wherein before receiving, by a switch, a mode switch request message sent by a controller, the method further comprises:

receiving, by the switch, a mode query instruction sent by the controller, wherein the mode query instruction is used to query a current mode of the switch; and sending, by the switch, a mode response message comprising the current mode to the controller, so that when the controller detects that a current network quality parameter is within a preset threshold and the current mode is the conventional switching mode, the controller sends the mode switch request message to the switch.

9. The method according to claim 8, wherein the mode switch response message is used to notify the controller that the switch successfully switches from the conventional switching mode to the OpenFlow switching mode, so that the controller reads the OpenFlow flow table and performs global network topology control and optimization.

10. A switch, comprising:

a memory storing routing and switching information tables; and a processor in communication with the memory, wherein the processor is configured to:

receive a mode switch request message sent by a controller, wherein the mode switch request message is used to instruct the switch to switch from a conventional switching mode to an OpenFlow switching mode;

when the mode switch request message is received, freeze all of the routing and switching information tables of the switch in the conventional switching mode, and convert, according to routing and switching information in each routing and switching information table, the routing and switching information table into an OpenFlow flow table corresponding to the routing and switching information table, wherein the OpenFlow flow table comprises at least one OpenFlow flow entry;

switch the switch to the OpenFlow switching mode; and send a mode switch response message to the controller.

11. The switch according to claim 10, wherein:
at least one routing and switching information table is a layer 3 IP address routing table comprising at least one routing entry, and each routing entry comprises a destination address, a mask, a protocol, a priority, a metrics value, a next-hop address, and an outbound port; and
the processor is further configured to:
convert, according to the destination address, the mask, the protocol, the priority, the metrics value, the next-hop address, and the outbound port that are comprised in the routing entry in the layer 3 IP address routing table, each routing entry in the layer 3 IP address routing table into an OpenFlow flow entry corresponding to the routing entry, wherein the OpenFlow flow entry forms an OpenFlow flow table, the OpenFlow flow entry comprises a match field, a match field mask, an action, and a priority, the match field in the OpenFlow flow entry comprises a destination IP address, and the action in the OpenFlow flow entry comprises: modify a destination MAC address and output to a specified port.

12. The switch according to claim 11, wherein for a first routing entry, the processor is further configured to:
use a destination address in the first routing entry as a destination IP address in a match field in a first OpenFlow flow entry, wherein the first routing entry is any routing entry in the layer 3 IP address routing table;
determine a match field mask in the first OpenFlow flow entry according to a mask in the first routing entry;
determine an action, modify destination MAC, in the first OpenFlow flow entry according to a protocol in the first routing entry or a protocol in a second routing entry, wherein the second routing entry is in the layer 3 IP address routing table, and a result obtained after an AND operation is performed on a destination address in the second routing entry and a mask in the second routing entry is equal to a result obtained after an AND operation is performed on a next-hop address in the first routing entry and the mask in the second routing entry;
use an outbound port in the first routing entry as a specified port for an action, output to a specified port, in the first OpenFlow flow entry; and
determine a priority in the first OpenFlow flow entry according to a priority in the first routing entry, a metrics value in the first routing entry, and a number of the first routing entry, wherein the number of the first routing entry is a number obtained after the first routing entry and all matched entries of the first routing entry are sequenced in ascending order of lengths of masks, and a matched entry of the first routing entry is a routing entry that is in the layer 3 IP address routing table and in which a result obtained after a bitwise AND operation is performed on a destination address in the routing entry and a mask in the routing entry is equal to a result obtained after an AND operation is performed on the destination address in the first routing entry and the mask in the routing entry.

13. The switch according to claim 12, wherein the processor is further configured to:
determine whether the protocol in the first routing entry is of a direct connection type;
if the protocol in the first routing entry is of a direct connection type, use the next-hop address in the first routing entry as a destination MAC address for the action, modify destination MAC, in the first OpenFlow flow entry; or if the protocol in the first routing entry is not of a direct connection type, obtain the second routing entry from the layer 3 IP address routing table, and determine whether the protocol in the second routing entry is of a direct connection type; and
if the protocol in the second routing entry is of a direct connection type, use a next-hop address in the second routing entry as a destination MAC address for the action, modify destination MAC, in the first OpenFlow flow entry.

14. The switch according to claim 12, wherein the processor is further configured to:
obtain, according to a preset correspondence between a priority in a routing entry and an OpenFlow mapping value, an OpenFlow mapping value corresponding to the priority in the first routing entry, and obtain, according to a preset correspondence between a metrics value in a routing entry and an OpenFlow mapping value, an OpenFlow mapping value corresponding to the metrics value in the first routing entry;
perform weighting on the number of the first routing entry according to a first preset weighting value, perform, according to a second preset weighting value, weighting on the OpenFlow mapping value corresponding to the priority in the first routing entry, and perform, according to a third preset weighting value, weighting on the OpenFlow mapping value corresponding to the metrics values in the first routing entry;
add a weighting result of the number of the first routing entry, a weighting result of the OpenFlow mapping value corresponding to the priority in the first routing entry, and a weighting result of the OpenFlow mapping value corresponding to the metrics value in the first routing entry; and
use an added result as the priority in the first OpenFlow flow entry.

15. The switch according to claim 10, wherein:
at least one routing and switching information table is a layer 2 MAC address forwarding table comprising at least one forwarding entry, and the forwarding entry comprises a MAC address, a virtual network identifier VLAN ID, and an outbound port; and
the processor is further configured to:
convert, according to the MAC address, the virtual network identifier VLAN ID, and the outbound port that are comprised in the forwarding entry in the layer 2 MAC address forwarding table, each forwarding entry into a second OpenFlow flow entry that corresponds to the forwarding entry and that comprises a match field and an action, wherein the OpenFlow flow entry forms a flow table, the OpenFlow flow entry comprises the match field and the action, the match field in the OpenFlow flow entry comprises a MAC address and a VLAN ID, and the action in the OpenFlow flow entry comprises output to a specified port.

16. The switch according to claim 15, wherein for a first forwarding entry, the processor is further configured to:
use a MAC address in the first forwarding entry as a MAC address in a match field in a second OpenFlow flow entry, wherein the first forwarding entry is any forwarding entry in the layer 2 MAC address forwarding table;
use a VLAN ID in the first forwarding entry as a VLAN ID in the match field in the second OpenFlow flow entry; and
use an outbound port in the first forwarding entry as a specified port for an action, output to a specified port, in the second OpenFlow flow entry.

17. The switch according to claim 10, wherein the processor is further configured to:
    before the mode switch request message sent by the controller is received, receive a mode query instruction sent by the controller, wherein the mode query instruction is used to query a current mode of the switch; and
    send a mode response message comprising the current mode to the controller, so that when the controller detects that a current network quality parameter is within a preset threshold and the current mode is the conventional switching mode, the controller sends the mode switch request message to the switch.

18. The switch according to claim 17, wherein the mode switch response message is used to notify the controller that the switch successfully switches from the conventional switching mode to the OpenFlow switching mode, so that the controller reads the OpenFlow flow table and performs global network topology control and optimization.

19. A switch mode switching system, comprising:
    a switch, wherein the switch includes a memory storing routing and switching information tables and a processor in communication with the memory; and
    a controller configured to control the switch in a centralized manner,
    wherein the switch is configured to:
        receive a mode switch request message sent by the controller, wherein the mode switch request message is used to instruct the switch to switch from a conventional switching mode to an OpenFlow switching mode;
        when the mode switch request message is received, freeze all of the routing and switching information tables of the switch in the conventional switching mode, and convert, according to routing and switching information in each routing and switching information table, the routing and switching information table into an OpenFlow flow table corresponding to the routing and switching information table, wherein the OpenFlow flow table comprises at least one OpenFlow flow entry;
        switch the switch to the OpenFlow switching mode; and
        send a mode switch response message to the controller.

* * * * *